(12) United States Patent
Coupe et al.

(10) Patent No.: US 11,574,240 B2
(45) Date of Patent: Feb. 7, 2023

(54) CATEGORIZATION FOR A GLOBAL TAXONOMY

(71) Applicant: YourAnswer International Pty Ltd., Adelaide (AU)

(72) Inventors: Rahmon Charles Coupe, Torrens Park (AU); Jonathan James Schutz, Upper Hermitage (AU); Halton James Stewart, Mile End (AU); Adam James Ingerman, Adelaide (AU)

(73) Assignee: YOURANSWER INTERNATIONAL PTY LTD., Adelaide (AU)

( * ) Notice: Subject to any disclaimer, the term of this patent is extended or adjusted under 35 U.S.C. 154(b) by 995 days.

(21) Appl. No.: 16/358,474

(22) Filed: Mar. 19, 2019

(65) Prior Publication Data

US 2019/0287018 A1     Sep. 19, 2019

Related U.S. Application Data

(60) Provisional application No. 62/645,106, filed on Mar. 19, 2018.

(51) Int. Cl.
| | | |
|---|---|---|
| *G06F 7/02* | (2006.01) | |
| *G06F 16/00* | (2019.01) | |
| *G06N 20/00* | (2019.01) | |
| *G06F 16/33* | (2019.01) | |

(Continued)

(52) U.S. Cl.
CPC ......... *G06N 20/00* (2019.01); *G06F 16/3347* (2019.01); *G06F 16/353* (2019.01); *G06F 16/9024* (2019.01)

(58) Field of Classification Search
CPC ... G06N 20/00; G06F 16/353; G06F 16/3347; G06F 16/9024
See application file for complete search history.

(56) References Cited

U.S. PATENT DOCUMENTS 10,706,450 B1 * 7/2020 Tavernier ............ G06F 16/9535
10,942,967 B1 * 3/2021 Biessmann ......... G06F 16/5838
(Continued)

OTHER PUBLICATIONS

Cerri, R., et al., "Adapting Non-Hierarchical Multilabel Classification Methods for Hierarchical Multilabel Classification," Intelligent Data Analysis, 15(6), 861-887, 2011.
(Continued)

*Primary Examiner* — Bruce M Moser
(74) *Attorney, Agent, or Firm* — Perkins Coie LLP

(57) ABSTRACT

Methods and systems are provided for generating training data for training a classifier to assign nodes of a taxonomy graph to items based on item descriptions. Each node has a label. For each item, the system identifies for that item one or more candidate paths within the taxonomy graph that are relevant to that item. The system identifies the candidate paths based on content of the item description of that item matching labels of nodes. A candidate path is a sequence of nodes starting a root node of the taxonomy graph. For each identified candidate path, the system labels the item description with the candidate path equivalently with leaf node or label of the leaf node. The labeled item descriptions compose the training data for training the classifier.

19 Claims, 24 Drawing Sheets

(51) Int. Cl.
    *G06F 16/35*        (2019.01)
    *G06F 16/901*     (2019.01)

(56) References Cited

U.S. PATENT DOCUMENTS

| | | | |
|---|---|---|---|
| 2012/0314941 A1* | 12/2012 | Kannan | G06K 9/6227 |
| | | | 382/161 |
| 2014/0172652 A1* | 6/2014 | Pobbathi | G06Q 10/087 |
| | | | 705/28 |
| 2018/0173699 A1* | 6/2018 | Tacchi | G06F 16/358 |
| 2018/0314921 A1* | 11/2018 | Mercep | G06K 9/6289 |
| 2019/0205432 A1* | 7/2019 | Kashyap | G06F 16/24578 |

OTHER PUBLICATIONS

Rehurek, R., Ph. D, "Scalability of Semantic Analysis in Natural Language Process," Faculty of Informatics, Masaryk University, May 2011.

\* cited by examiner

| LABEL | VARIANTS | PARENTS | match rules |
|---|---|---|---|
| active tees | active tee, tee, tees | active tops | |
| active tops | active top, tops, top | activewear | |
| activewear | sportswear, sportwear, sports wear, sport wear, athleisure, active wear | apparel, dancewear | [["!any", "active\|athlet\|sport", 0], ["any", "active\|athlet\|sport", 1.5],["title\|cat", "baby\|infant\|toddler", 0]] |
| apparel | | | |
| bottoms | bottom | clothing | |
| clothing | clothes, something to wear, gear | apparel | |
| clothing accessories | accessories | apparel | |
| lingerie | lingerie sets, lingerie set | underwear | [["title\|cat", "baby\|infant\|toddler", 0], ["any", "lingerie\|sexy\|intimate", 0]] |
| lingerie dresses | lingerie dress, intimate dress, intimate dresses | lingerie | |
| tees | t shirts, tee shirts, tee, tee shirt, t shirt, tshirt, tshirts, teeshirt, teeshirts, t-shirt, t-shirts | tops | |
| tops | top | clothing | |
| underwear | intimates, undies, undergarment, undergarments | apparel | |
| pants | trousers, trouser, pant | bottoms | |
| skirts | skirt | bottoms | |
| blouses | blouse | tops | |
| dancewear | | apparel | |

201 indicates the rows from "active tees" through "activewear".
202 indicates the rows from "apparel" through "dancewear".

*FIG. 2*

| | Path Identifier | Label | Parent Path |
|---|---|---|---|
| | 0 | apparel | |
| | 1 | activewear | activewear/apparel |
| 301 | 2 | active tops | active tops/activewear/apparel |
| | 3 | active tees | active tees/active tops/activewear/apparel |
| | 4 | clothing | clothing/apparel |
| | 5 | bottoms | bottoms/clothing/apparel |
| | 6 | pants | pants/bottoms/clothing/apparel |
| | 7 | skirts | skirts/bottoms/clothing/apparel |
| | 8 | tops | tops/clothing/apparel |
| 303 | 9 | tees | tees/tops/clothing/apparel |
| | 10 | blouses | blouses/tops/clothing/apparel |
| | 11 | clothing accessories | clothing accessories/apparel |
| | 12 | underwear | underwear/apparel |
| | 13 | lingerie | lingerie/underwear/apparel |
| | 14 | lingerie dresses | lingerie dresses/lingerie/underwear/apparel |
| | 15 | dancewear | dancewear/apparel |
| 302 | 16 | active tops | active tops/dancewear/apparel |
| | 17 | active tees | active tees/active tops/dancewear/apparel |

*FIG. 3*

| Sequence Length | Sequence and Corresponding Path Identifier | |
|---|---|---|
| 3 words | 'something to wear': [4] | 'somethings to wear': [4] |
| 2 words | 'sports wear': [1],<br>'active wears': [1],<br>'sports wears': [1],<br>'sport wears': [1],<br>'sport wear': [1],<br>'active wear': [1],<br>'active top': [2, 16],<br>'active tops': [2, 16],<br>'active tee': [3, 17],<br>'active tees': [3, 17], | 't shirts': [9],<br>'tee shirts': [9],<br>'t shirt': [9],<br>'tee shirt': [9],<br>'clothing accessories': [11],<br>'clothing accessory': [11],<br>'lingerie set': [13],<br>'lingerie sets': [13],<br>'intimate dresses': [14],<br>'lingerie dress': [14],<br>'lingerie dresses': [14],<br>'intimate dress': [14] |
| 1 word | 'apparels': [0],<br>'apparel': [0],<br>'sportwear': [1],<br>'activewears': [1],<br>'athleisure': [1],<br>'athleisures': [1],<br>'sportswears': [1],<br>'activewear': [1],<br>'sportswear': [1],<br>'sportwears': [1],<br>'top': [2, 8, 16],<br>'tops': [2, 8, 16],<br>'tee': [3, 9, 17],<br>'tees': [3, 9, 17],<br>'clothe': [4],<br>'clothes': [4],<br>'gear': [4],<br>'gears': [4],<br>'clothings': [4],<br>'clothing': [4],<br>'bottoms': [5],<br>'bottom': [5],<br>'trouser': [6],<br>'trousers': [6],<br>'pant': [6], | 'pants': [6],<br>'skirts': [7],<br>'skirt': [7],<br>'tshirt': [9],<br>'teeshirts': [9],<br>'tshirts': [9],<br>'teeshirt': [9],<br>'t-shirt': [9],<br>'t-shirts': [9],<br>'blouse': [10],<br>'blouses': [10],<br>'accessories': [11],<br>'accessory': [11],<br>'underwears': [12],<br>'undergarment': [12],<br>'underwear': [12],<br>'undergarments': [12],<br>'intimates': [12],<br>'intimate': [12],<br>'undies': [12],<br>'lingerie': [13],<br>'lingeries': [13],<br>'dancewear': [15],<br>'dancewears': [15] |

401 (pointing to 'active top': [2, 16])

FIG. 4

| Field Name | Field Contents |
|---|---|
| Title | 'BEBE Sequin Logo Tee', |
| Category | 'bebe',<br>'active tops',<br>'apparel',<br>'athleisure',<br>'brands' |
| Text | ' BEBE Sport active top. "BEBE" logo in sequin on center front. Mesh inset on the sleeve. Soft and smooth to the touch fabrication all over.  Can be worn as a set with the matching BEBE color block leggings.  Model is wearing a plus size 1X. Length: 25 in.  88% polyester, 12% spandex. Machine wash cold with like colors. Do not use fabric softener. Do not bleach. Tumble dry low. Do not iron. Do not dry clean. ',<br>'New Arrivals :: View All New Arrivals',<br>'Active Tops :: Athleisure :: BEBE :: Brands :: View All Athleisure',<br>'Add style to your workout session, or lounge day, in this active top by BEBE Sport. With a sequin BEBE logo on front and mesh sleeves, this top is super comfy and chic too. Finish off the look by pairing it with the matching color block leggings. Available sizes 1X, 2X, 3X. BEBE Sport active top. "BEBE" logo in sequin on center front. Mesh inset on the sleeve. Soft and smooth to the touch fabrication all over.' |

*FIG. 5*

| | |
|---|---|
| 1310 | TAIL MATCH on 'brands' produced 0 candidates: [[]] |
| | TAIL MATCH on 'apparels' produced 1 candidates: [['apparel[0]: apparel']] |
| | TAIL MATCH on 'bebes' produced 0 candidates: [[]] |
| | TAIL MATCH on 'athleisure' produced 1 candidates: [['activewear[1]: activewear/apparel']] |
| | TAIL MATCH on 'athleisures' produced 1 candidates: [['activewear[1]: activewear/apparel']] |
| | TAIL MATCH on 'bebe' produced 0 candidates: [[]] |
| 1320 | TAIL MATCH on 'active top' produced 2 candidates: [['active tops[2]: active tops/activewear/apparel', 'active tops[16]: active tops/dancewear/apparel']] |
| | TAIL MATCH on 'active tops' produced 2 candidates: [['active tops[2]: active tops/activewear/apparel', 'active tops[16]: active tops/dancewear/apparel']] |
| | TAIL MATCH on 'brand' produced 0 candidates: [[]] |
| | TAIL MATCH on 'apparel' produced 1 candidates: [['apparel[0]: apparel']] |

*FIG. 13A*

| |
|---|
| 'apparel[0]: apparel', |
| 'active tops[2]: active tops/activewear/apparel', |
| 'active tops[16]: active tops/dancewear/apparel', |
| 'activewear[1]: activewear/apparel' |

*FIG. 13B*

| |
|---|
| 'active tees[3]: active tees/active tops/activewear/apparel' |
| 'tees[9]: tees/tops/clothing/apparel' |
| 'active tees[17]: active tees/active tops/dancewear/apparel' |

*FIG. 16A*

| First Path (Candidate Path) | Second Path (Category Path) and Corresponding Depth | | | | $n$ | $\max(d)$ | $\gamma(1 + \log(n + \max(d)))$ |
|---|---|---|---|---|---|---|---|
| | activewear[1]: activewear/apparel | active tops[16]: active tops/dancewear/apparel | apparel[0]: apparel | active tops[2]: active tops/activewear/apparel | | | |
| active tees[3]: active tees/active tops/activewear/apparel | 2 | - | 3 | 1 | 3 | 3 | 2.51 |
| tees[9]: tees/tops/clothing/apparel | | | 3 | | 1 | 3 | 2.15 |
| active tees[17]: active tees/active tops/dancewear/apparel | - | - | 3 | 1 | 2 | 3 | 2.35 |

| Match rules for candidate node [active tees[17]] gave the score [2.34] using the match rules [[]] |
| Match rules for candidate node [active tees[3]] gave the score [3.76] using the match rules [["!any", "active\|athlet\|sport", 0], ["any", "active\|athlet\|sport", 1.5],["title\|cat", "baby\|infant\|toddler", 0]] |
| Match rules for candidate node [tees[9]] gave the score [2.15] using the match rules [[]] |

*FIG. 18A*

CATEGORIZATION FOR A GLOBAL TAXONOMY

CROSS-REFERENCE TO RELATED APPLICATION(S)

This application claims the benefit of U.S. Provisional Application No. 62/645,106, filed on Mar. 19, 2018, which is incorporated by reference herein in its entirety.

BACKGROUND

E-commerce search systems generally use keyword matching in an attempt to generate items relevant to a query. When a user (or software system) submits a query to a search system, the search system identifies items (e.g., shoes) in a database which have a degree of correlation to the words in the user's query according to some metric. The search system then returns the most relevant items based on that metric as search results. For example, a company may sell apparel items through its e-commerce web site. The web site may describe one item as "red dress" and another item as "red shoes." If a user of the web site submits a query "red dress shoes," the search system may determine that each description will match on 2 out of 3 words of the query. Using a metric based on number of word matches, the search system may generate a relevance score of ⅔ for each item. However, based on the user's likely intent to find red shoes that are dress shoes, the "red dress" item is likely to be less relevant than the "red shoes" item. Even the "red shoes" item may not be particularly relevant if the "red shoes" item is a casual shoe rather than a dress shoe.

To improve the relevance of search results, more sophisticated search systems employ concept mapping. A concept map is a hierarchical organization of concepts such as category relations. For example, one category relation may be "clothing/dresses" and another may be "footwear/shoes/dress shoes." A "red dress" item may be associated with the "clothing/dresses" category relation, and a "red shoes" item may be associated with both the "footwear/shoes/dress shoes" and the "footwear/shoes/casual shoes" category relations. When the initial search results are "red dress" item and "red shoes" item, the search system uses category relations to determine that the "red shoes" item is likely more relevant because "red dress shoes" is more similar to the category relation of "footwear/shoes/dress shoes" than the category relation of "clothing/dresses." Although the search system may include both items in the search results, the "red shoes" item would have a higher ranking.

The hierarchical organization of concepts allows for more general queries and supports suggestions. For example, when a query is "footwear," the search system may generate search results that include all footwear items including the "red shoes" item. In contrast, when a query is "red shoes" and the category relations include "shoes/dress shoes" and "shoes/casual shoes," the search system may first identify both categories of "shoes" as relevant. Because "dress shoes" and "casual shoes" are both sub-categories of "shoes," the search system may ask the user: "Are you interested in red dress shoes or red casual shoes?" When the user answers "dress," the search system would rank items mapped to "shoes/dress shoes" higher in the search results than items mapped to "shoes/casual shoes."

Thus, concept mapping allows for associating items, based on their descriptions, to one or more concepts. The concepts for an item may be explicit or implicit in the item's description although preferable to be both explicit and hierarchical.

A search system may generate concept maps automatically using techniques such as topic models and latent semantic indexing. Different concept maps may be generated depending on the items and their descriptions used to generate the concept maps. Unfortunately, such automatically generated concept maps may bear little relation to the organization of categories that a person would generate.

Rather than generating a concept map, a search system may generate a semantic similarity model. A semantic similarity model is generated by a process of learning implicit relationships between documents and queries based on a large history of queries and documents selected by users. Semantic similarity models do not generate a hierarchy of categories and rely on historical data being available. Semantic similarity models allow for a high degree of automation and can improve search results in many cases, but at the risk of a high error rate when concepts are inaccurately mapped to queries.

A search system may also employ a predefined taxonomical hierarchy or taxonomy graph of categories based on expert knowledge. Defining such a taxonomy graph may require defining thousands of nodes, which can be a very complex and time-consuming task. However, the taxonomy graph need only be created once as it reflects the actual organization of categories as defined by a person to represent a real-world organization of categories. Experts may also define synonyms for concepts to allow matching on terms which are in general use, rather than just the terms used in one specific e-commerce environment. Expert knowledge may be supplemented by automated collection of terms and synonyms, such as by visiting (e.g., automated web crawling) a large number of related e-commerce environments and collecting commonly used terms related to a particular node in the taxonomy graph.

Once a taxonomy graph is defined, nodes may be assigned to items using a classifier that is generated using machine learning based on training data generated manually by an expert. The training data assigns nodes to items. The generating of such training data is both onerous and time-consuming because an expert needs to then search through thousands of nodes to find the most relevant node and multiple nodes may have similar relevance. The classifier generated using training data for one e-commerce environment may not be an effective classifier for another e-commerce environment because item descriptions and terminology will differ from environment to environment. For example, the taxonomy graph for a web site for selling sport apparel may not be useful for a web site selling children apparel. As a result, a taxonomy graph may need to be generated for each web site, which can be expensive and time-consuming.

BRIEF DESCRIPTION OF THE DRAWINGS

FIG. 2 illustrates a taxonomy definition table defining the taxonomy graph of FIG. 1.

FIG. 3 illustrates a table indicating the paths of the taxonomy graph of FIG. 1.

FIG. 4 illustrates a table containing lookup sets generated from the taxonomy definition table of FIG. 2.

FIG. 5 illustrates an item description.

FIGS. 13A and 13B illustrate tables relating to the identification of category paths for the ID of FIG. 5.

FIG. 16A illustrates a table containing tail matched paths for text.

FIG. 17A illustrates a table containing scores for the candidate paths of FIG. 16A.

FIG. 18A illustrates a table indicating the rule matches for candidate paths.

DETAILED DESCRIPTION

Figure 1:
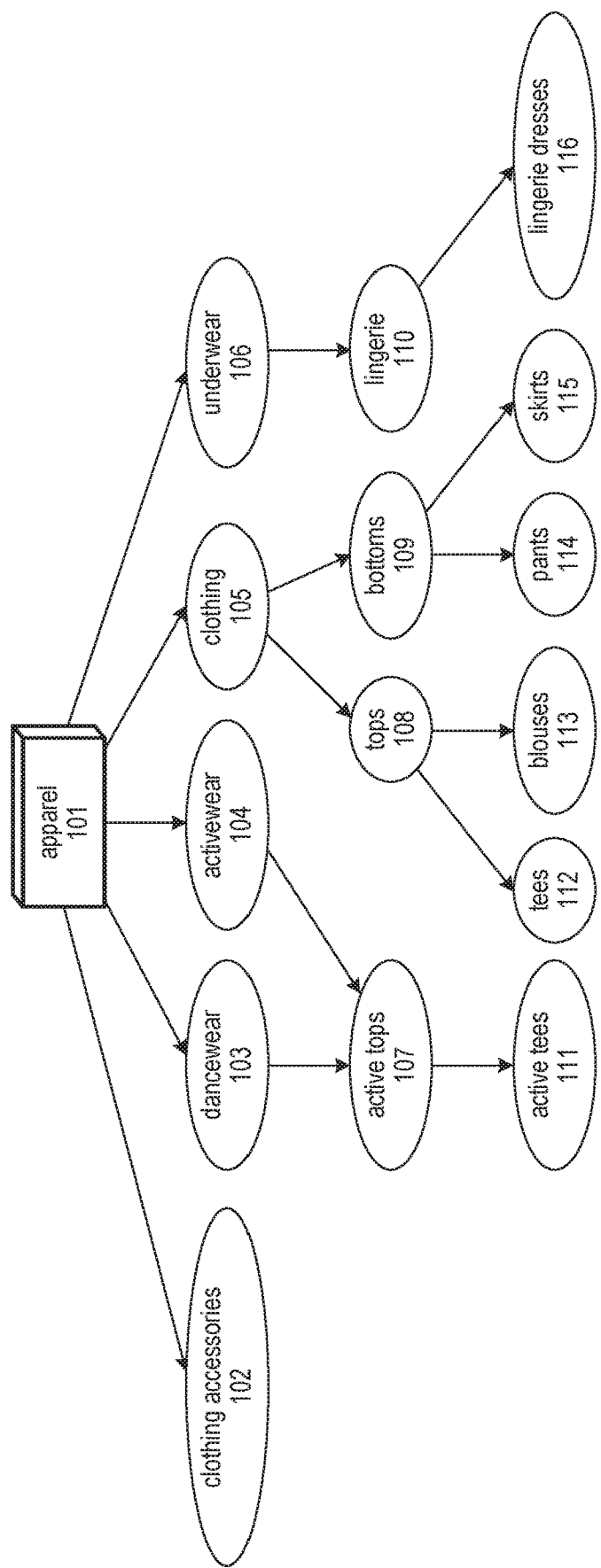
FIG. 1 illustrates a taxonomy graph.

Methods and systems for assigning to an item a node of a taxonomy graph based on an item description of the item as a categorization of the item are provided. In some embodiments, a categorization system inputs an item description and identifies candidate paths of a taxonomy graph that are candidates to be assigned to the item. The categorization system identifies the candidate paths based on relevance of the labels of nodes derived from comparison of content of the item description to the labels of the nodes of the taxonomy graph. When a label is determined to be relevant, the categorization system indicates that the paths from the nodes with that label to the root node of the taxonomy graph are candidate paths and generates a relevance score for each candidate path. For each candidate path, the categorization system applies a classifier to the item description to identify classification paths and for each classification path, a classification score indicating relevance of the classification path. For each candidate path, the categorization system combines the candidate score and the classification score of the corresponding classification path to generate a final score for that candidate path. The classification system then assigns one or more candidate paths with the highest final scores to the item.

DEFINITION OF TERMINOLOGY

| | |
|---|---|
| Taxonomy graph | A taxonomy graph is an acyclic hierarchical graph having nodes with labels. Each node, except the root node, has one or more parent nodes. A node may also have a set of associated variants and matching rules. |
| Label | A label is text that contains one or more elements (e.g., words). For example, a label may be "apparel" or "active tops." A label is unique in the taxonomy graph. |
| Path | A path is a node and its ancestor nodes. |
| Item description | An item description is a collection of text that describes an item. An item description may include fields such as a title field, a category field, and a text field. (The category field in an item description is intrinsic to the environment in which item descriptions are specified, and not directly related to the definition of category given below). |
| Variant | A variant of a label is a synonym (i.e., a phrase with one or more elements) or another form of the label. For example, the label "active tops" may have the synonym "active tee" and other forms of "top" and "tops." A label is a variant of itself. Variants may be specified by a user and generated by algorithmic means. Unlike labels, variants are not unique. Extending the example above, "tops" may be a variant assigned to nodes labeled "active tops" and another labeled "pajama tops", as well as being a label itself. |
| Lookup set | A lookup set for a variant maps that variant to each path with a leaf node for which that variant is a variant of the label of that leaf node. For example, "top" is a variant associated with a node labeled "active tops" and is therefore mapped to all paths having the leaf node with the label "active tops." |
| Tail match | A tail match refers to the longest tail portion of text that matches other text. A tail portion is a sequence of elements of the text that includes the last element of the other text. For example, if the text |

| | |
|---|---|
| | is the label "red dress shoe" and the other text is "dress shoe," then there is a tail match that is "dress shoe." In contrast, if the other text is "red dress," then there is no tail match because "red dress" does not include the last element "shoe." |
| Any match | An any match refers to any portion of text that matches the other text. For example, if the text is the label "red dress shoes" and the other text is "red dress," then there is an any match because the text contains "red dress." In contrast, if the other text is "slippers," then there is no any match as "slippers" is not anywhere in the text. |
| Category | A category is a hierarchical sequence of one or more labels. |
| Category node | A category node is a node of the taxonomy graph with a label that matches a label of a category. |
| Candidate path | A candidate path for an item is a path of the taxonomy graph that is a candidate to be assigned to item. |

FIG. 1 illustrates a taxonomy graph. Each node 101-116 includes a label. For example, the label for node 107 is "active tops." The paths that have node 107 as a leaf node are path 101/103/107 and path 101/104/107. In path 101/103/107, nodes 101 and 103 are ancestor nodes. The parent node of a child node represents a higher-level categorization of the child node. For example, parent node 103 of child node 107 represents that "dancewear" is a higher-level categorization of "active tops."

FIG. 2 illustrates a taxonomy definition table defining the taxonomy graph of FIG. 1. Each row of the table represents a node of the taxonomy graph. For example, row 201 represents node 107. Each row includes the label of the node, the label(s) of the parent node(s), and the variants of the label of the node. For example, row 201 has the labels of "active tops"; the variants of "active top", "tops", and "top"; and the labels of its parent nodes "apparel" and "dancewear". The match rules will be described later.

FIG. 3 illustrates a table indicating the paths of the taxonomy graph of FIG. 1. The table contains, for each node, a row for each path with that node as a leaf node. Each row contains the label of the leaf node of the path and a specification of the path with that leaf node using the labels of the nodes of the path. For example, row 301 represents the path 101/104/107, row 302 represents the path 101/103/107, and row 303 represents the path 101/105/108/112. Each row also contains a path identifier. For example, the path identifier of row 302 is 16. Since multiple paths can have the same leaf node (e.g., paths of rows 301 and 302), the label of a leaf node is not a unique identifier of a path.

FIG. 4 illustrates a table containing lookup sets generated from the taxonomy definition table of FIG. 2. The table includes a lookup set for each variant of a label specified in the taxonomy definition table. Each lookup set maps the variant to each path with a leaf node that has a label with that variant. For example, lookup set 401 represents the "active top" variant of the "active tops" label of node 107. Lookup set 401 maps to paths with the path identifiers of 2 and 16, representing paths 101/104/107 and 101/103/107, respectively. The lookup sets are managed in groups according to sequence length (being the number of words in the variant).

FIG. 5 illustrates an item description. The item description includes the title "BEBE Sequin Logo Tee." The item description includes category sequences such as "athleisure" and "active tops." Each text entry is delimited by quotations.

Figure 6:
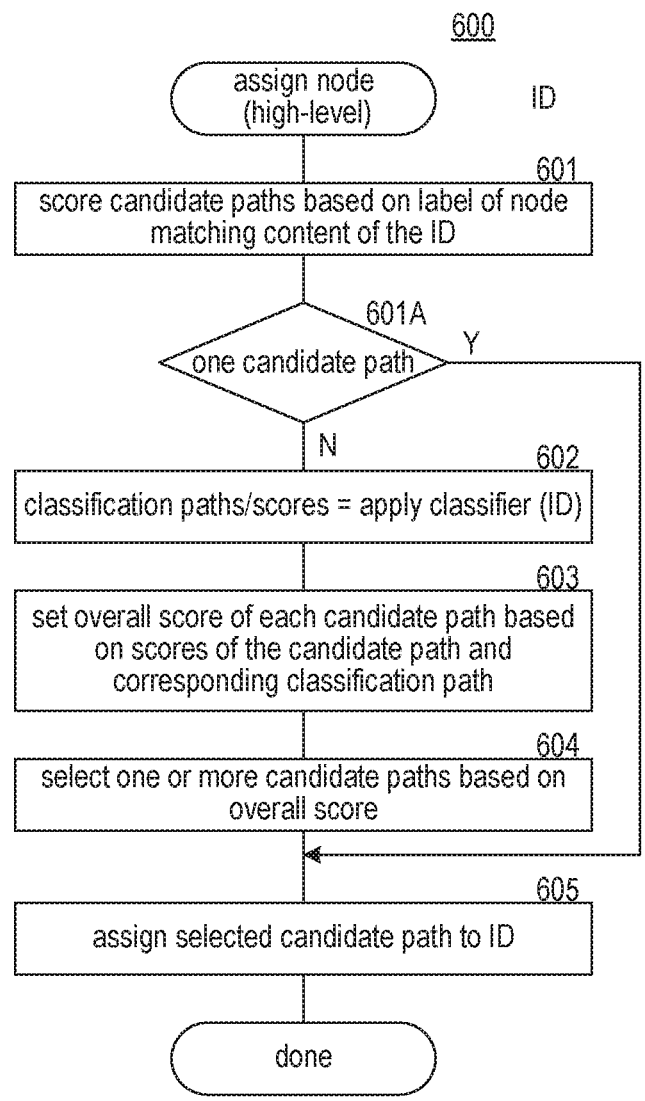
FIG. 6 is a flow diagram that illustrates high-level processing of a component that assigns a node of the taxonomy graph to an item description in some embodiments.

FIG. 6 is a flow diagram that illustrates the high-level processing of a component that assigns a path of the taxonomy graph to an item description in some embodiments. The assign node component 600 is provided the item description ("ID"). In block 601, the component generates scores for candidate paths for the ID based on features of nodes matching content of the ID. The features of a node include variants of the label of the node and matching rules associated with the node. A score is a metric that indicates the likelihood that the path is the best path to be assigned to an ID. In decision block 601A, if only one candidate path has a sufficiently high score, then further classification processing is unnecessary and the component continues at block 605, else the component continues at block 602. In block 602, the component applies a classifier to the item description to generate scores for one or more classification paths. A classification path is a path identified by a classifier trained by the categorization system, chosen from the subset of paths for which training data was able to be generated. In block 603, the component sets an overall score for each candidate path if any based on the score of that candidate path and the score of its corresponding classification path if any. In block 604, the component selects the candidate path or paths with an overall score that indicates a likelihood that the candidate path should be assigned to the ID. In block 605, the component assigns the candidate path(s) to the ID.

Figure 7:
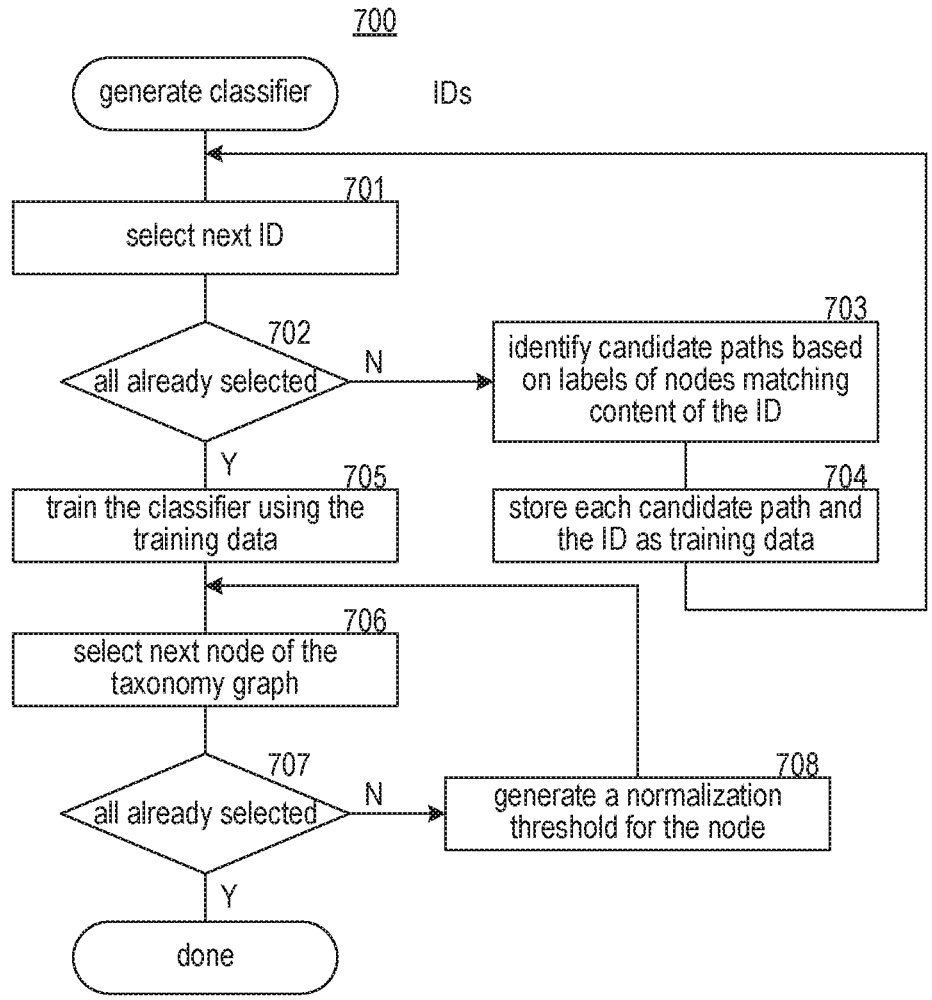
FIG. 7 is a flow diagram that illustrates high-level processing of a component that generates a classifier for the categorization system in some embodiments.

FIG. 7 is a flow diagram that illustrates high-level processing of a component that generates a classifier for the categorization system in some embodiments. A generate classifier component 700 is provided a collection of IDs and trains the classifier using training data derived from those IDs. In blocks 701-704, the component loops identifying candidate paths for each ID. In block 701, the component selects the next ID. In decision block 702, if all the IDs have already been selected, then the component continues at block 705, else the component continues at block 703. In block 703, the component identifies candidate paths based on labels of nodes of the taxonomy graph matching content of the selected ID. In block 704, the component stores each candidate path, the ID, and optionally a score for the candidate path as the training data. The component then loops to block 701 to select the next ID. In block 705, the component trains the classifier using the training data and stores data learned (referred to as the model) via the training for use when classifying a path. In block 706-708, the component loops generating a normalization threshold for the nodes of the taxonomy graph. Since the labels of nodes are not independent and the training data may be unevenly distributed across the nodes, the classification scores may not be comparable between nodes. To account for the classifications scores not being comparable, the component generates a normalization threshold for normalizing the classification scores. In block 706, the component selects the next node of the taxonomy graph. In decision block 707, if all the nodes have already been selected, then the component completes, else the component continues at block 708. In block 708, the component generates the normalization threshold for the selected node and stores the normalized threshold for use when classifying a path and loops to block 706 to select the next node.

Figure 8:
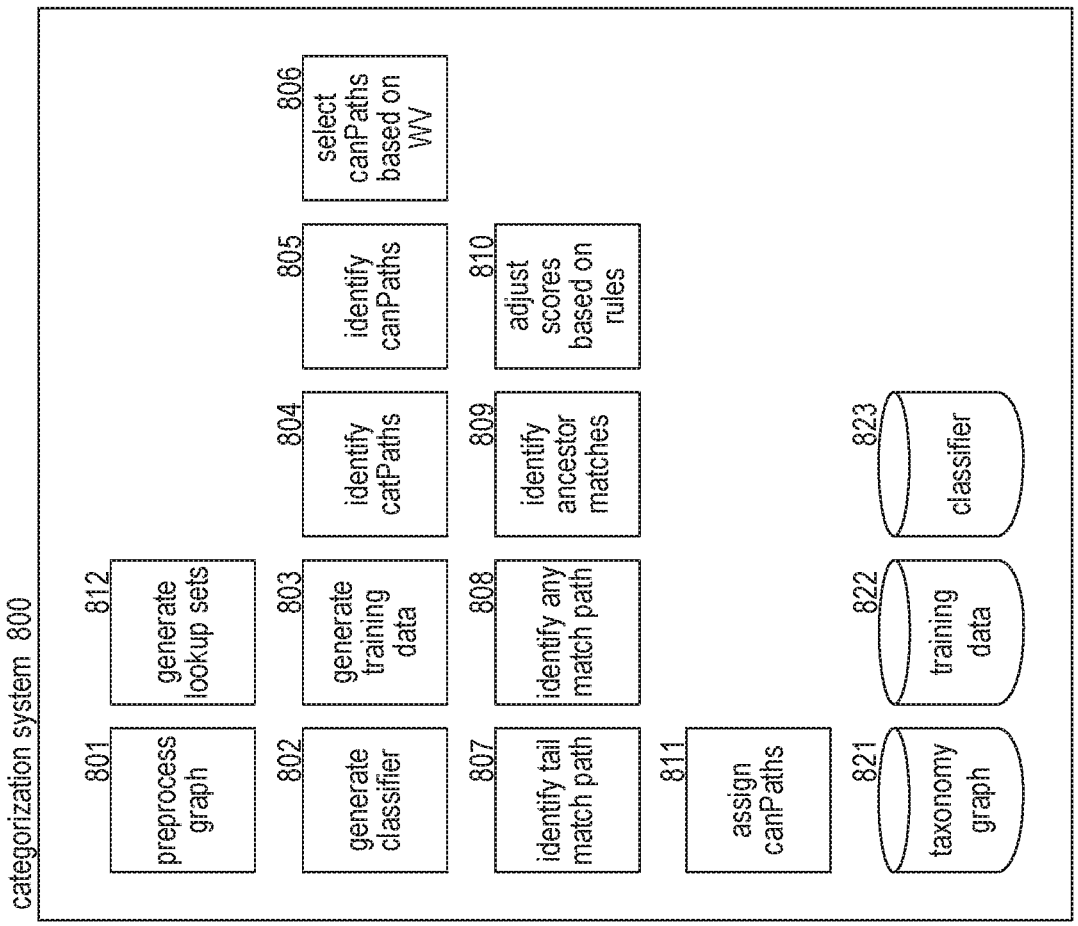
FIG. 8 is a block diagram illustrating components of the categorization system in some embodiments.

FIG. 8 is a block diagram illustrating components of the categorization system in some embodiments. The categorization system 800 includes components 801-812 and data stores 821-823. The preprocess graph component 801 preprocesses a taxonomy graph to generate lookup sets. A generate classifier component 802 receives item descriptions and generates a classifier based on those item descriptions. A generate training data component 803 generates the training data for training the classifier. An identify category paths ("catPaths") component 804 identifies the category paths for an item description. An identify candidate paths ("canPaths") component 805 identifies candidate paths for an item description. A select candidate paths based on a word vector ("WV") component 806 selects candidate paths based on a word vector comparison. An identify tail match path component 807 identifies candidate paths based on matching the tail portion of text. An identify any match path component 808 identifies candidate paths based on matching any portion of text. An identify ancestor matches component 809 identifies an ancestor path of a path that matches a target path. An adjust scores based on rules component 810 applies a set of rules to candidate paths to adjust the scores of the candidate paths. An assign candidate paths component 811 is provided an ID for an item and assigns candidate paths to that item. A generate lookup sets component 812 generates lookup sets for a taxonomy graph. A taxonomy graph store 821 stores the definition of a taxonomy graph. A training data store 822 stores training data for use in training a classifier. The training data includes mappings of IDs to candidate paths. A classifier store 823 stores learned data (e.g., weights) for the classifier generated during the generation of the classifier.

The computing systems (e.g., network nodes or collections of network nodes) on which the categorization system and the other described systems may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include high-performance computing systems, cloud-based servers, desktop computers, laptops, tablets, e-readers, personal digital assistants, smartphones, gaming devices, servers, and so on. For example, the simulations and training may be performed using a high-performance computing system, and the classifications may be performed by a tablet. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the categorization system and the other described systems. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The categorization system and the other described systems may be described in the general context of computer-executable instructions, such as program modules and components, executed by one or more computers, processors, or other devices. Generally, program modules or components include routines, programs, objects, data structures, and so on that perform tasks or implement data types of the categorization system and the other described systems. Typically, the functionality of the program modules may be combined or distributed as desired in various examples. Aspects of the categorization system and the other described systems may be implemented in hardware using, for example, an application-specific integrated circuit ("ASIC") or field programmable gate array ("FPGA").

Figure 9:
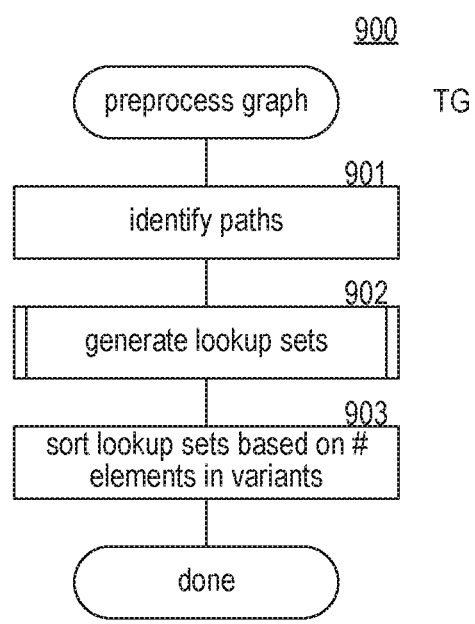
FIG. 9 is a flow diagram that illustrates the processing of a preprocess graph component of the categorization system in some embodiments.

FIG. 9 is a flow diagram that illustrates the processing of a preprocess graph component of the categorization system in some embodiments. The preprocess graph component 900 generates lookup sets sorted by number of elements in the variants that are mapped to paths. In block 901, the component identifies the paths of the taxonomy graph. In block 902, the component invokes a generate lookup sets component to generate the lookup sets based on the identified paths. In block 903, the component sorts the lookup sets based on number of elements in the variants and then completes.

Figure 10:
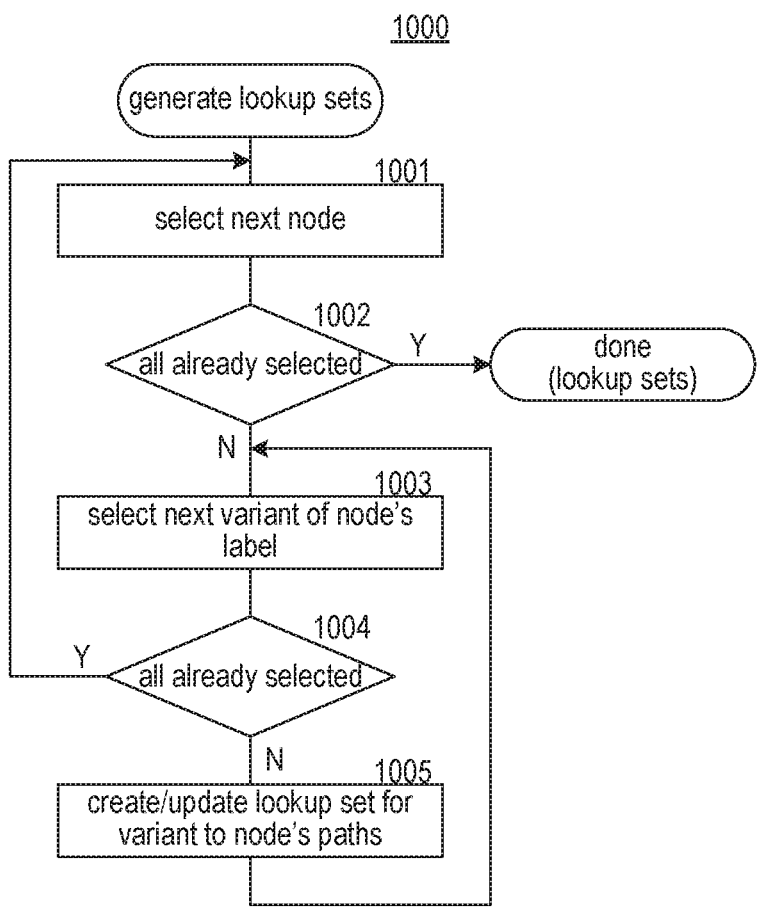
FIG. 10 is a flow diagram that illustrates the processing of a generate lookup sets component of the categorization system in some embodiments.

FIG. 10 is a flow diagram that illustrates the processing of a generate lookup sets component of the categorization system in some embodiments. The generate lookup sets component 1000 generates a lookup set for each variant of a label of a taxonomy graph. In block 1001, the component selects the next node of the taxonomy graph. In decision block 1002, if all the nodes have already been selected, then the component completes, else the component continues at block 1003. In block 1003, the component selects the next variant of the label of the selected node. In decision block 1004, if all the variants have already been selected, then the component loops to block 1001 to select the next node, else the component continues at block 1005. In block 1005, the component creates (or updates if already created) a label set for the selected variant that maps the selected variant to each path that has the selected node as its leaf node. The component then loops to block 1003 to select the next variant. FIG. 4 illustrates the lookup sets for the taxonomy definition table of FIG. 2.

Figure 11:
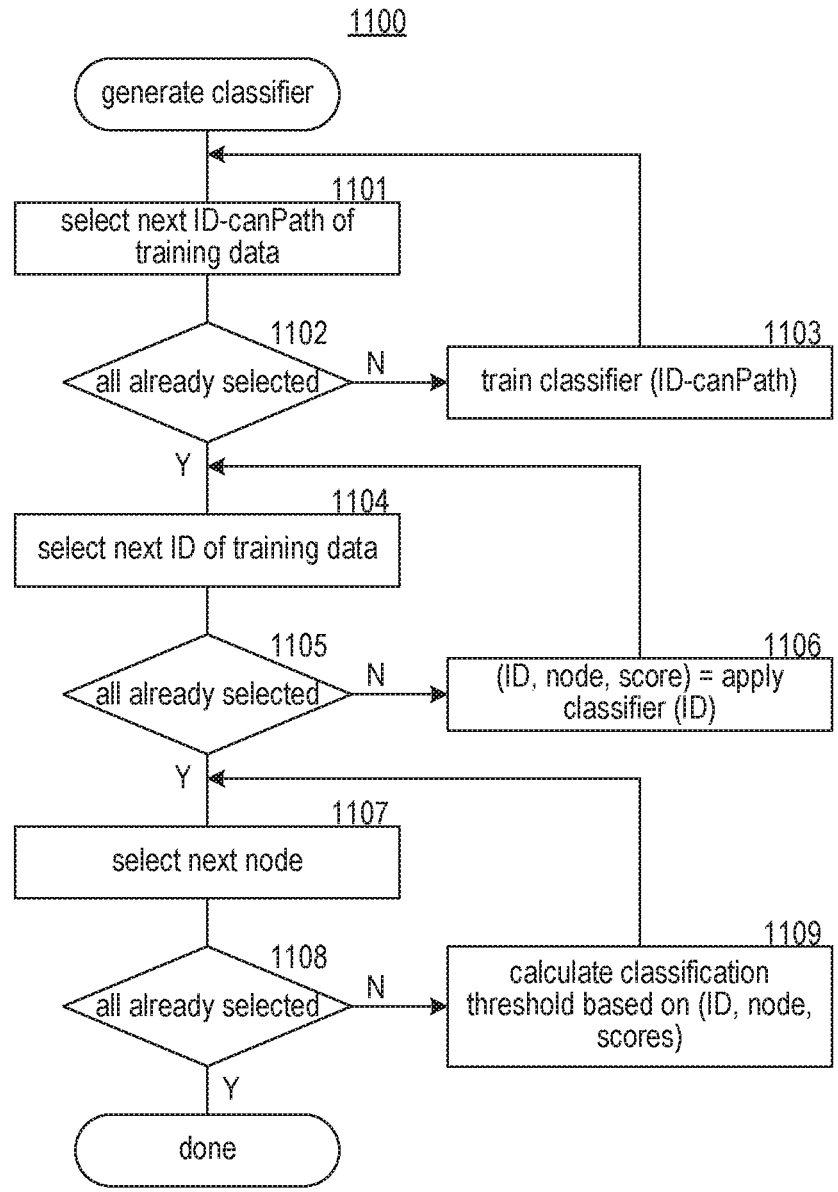
FIG. 11 is a flow diagram that illustrates the processing of a generate classifier component of the categorization system in some embodiments.

FIG. 11 is a flow diagram that illustrates the processing of a generate classifier component of the categorization system in some embodiments. The generate classifier component 1100 accesses training data and trains the classifier and generates normalization thresholds. In block 1101, the component selects the next ID to candidate path mapping of the training data. In decision block 1102, if all the mappings have already been selected, then the component continues at block 1104, else the component continues at block 1103. In block 1103, the component trains the classifier based on the selected mapping and then loops to block 1101 to select the next mapping. In block 1104, the component selects the next item description of the training data. In decision block 1105, if all the item descriptions have already been selected, then the component continues at block 1107, else the component continues at block 1106. In block 1106, the component applies the classifier to assign a node to the item description and generates a score for the assignment. The component then loops to block 1104 to select the next item description. In block 1107, the component selects the next node of the taxonomy graph. In decision block 1108, if all the nodes have already been selected, then the component completes, else the component continues at block 1109. In block 1109, the component calculates the classification threshold for the selected node and loops to block 1107 to select the next node.

The classifier model may be trained by iterating through all of the item descriptions and labels stored in the item repository and providing these as inputs to a suitable multi-label classification algorithm such as a Random Forest Classifier. There are numerous classification algorithms in the scientific literature and available in scientific software libraries; any algorithm that is able to perform multi-label classification (that is, to generate potentially more than one label prediction for a given input, where the predicted labels either exceed a defined level of confidence or are provided with a confidence indicator) is suitable. Since the taxonomy paths form a hierarchy, a hierarchical multilabel classification algorithm may be used, or each taxonomy path may be treated as an independent label and a non-hierarchical algorithm such as the Random Forest Classifier may be employed. Non-hierarchical algorithms may be adapted in other ways. (See, Cerri, R., Carvalho, A. C., & Freitas, A. A., "Adapting Non-Hierarchical Multilabel Classification Methods for Hierarchical Multilabel Classification," Intelligent Data Analysis, 15(6), 861-887, 2011.)

To generate the normalization thresholds for the nodes, the generate classifier component uses the newly trained classifier to generate classification scores for the training data. The component then identifies the classification scores for a node associated with correct classifications and the classification scores for that node associated with incorrect classifications. The component then sets the normalization threshold for the node to the classification score for which the number of correct predictions with classification scores below that classification score is equal to the number of incorrect predictions with classification scores above that classification score. If a classification score is equal to this normalization threshold, the probability of the classification being correct is 0.5. The component scales the original classification scores for a node. The scaled classification score is a probability between 0 and 1 and generated based on the formula:

$$p = e^{\lambda(S - S_T)}$$

where p is the probability, S is the original classification score, $S_T$ is the normalization threshold, and $\lambda$ is a scaling constant. When $\lambda$=4.5 the scaling is such that if $S_T$=0.5, then p=0.2 when S=0.2 and p=0.8 when S=0.8. In this way, when the original classification score represents a probability with a normalization threshold 0.5, then the original classification score is approximately preserved in the resulting scaled classification score.

Figure 12:
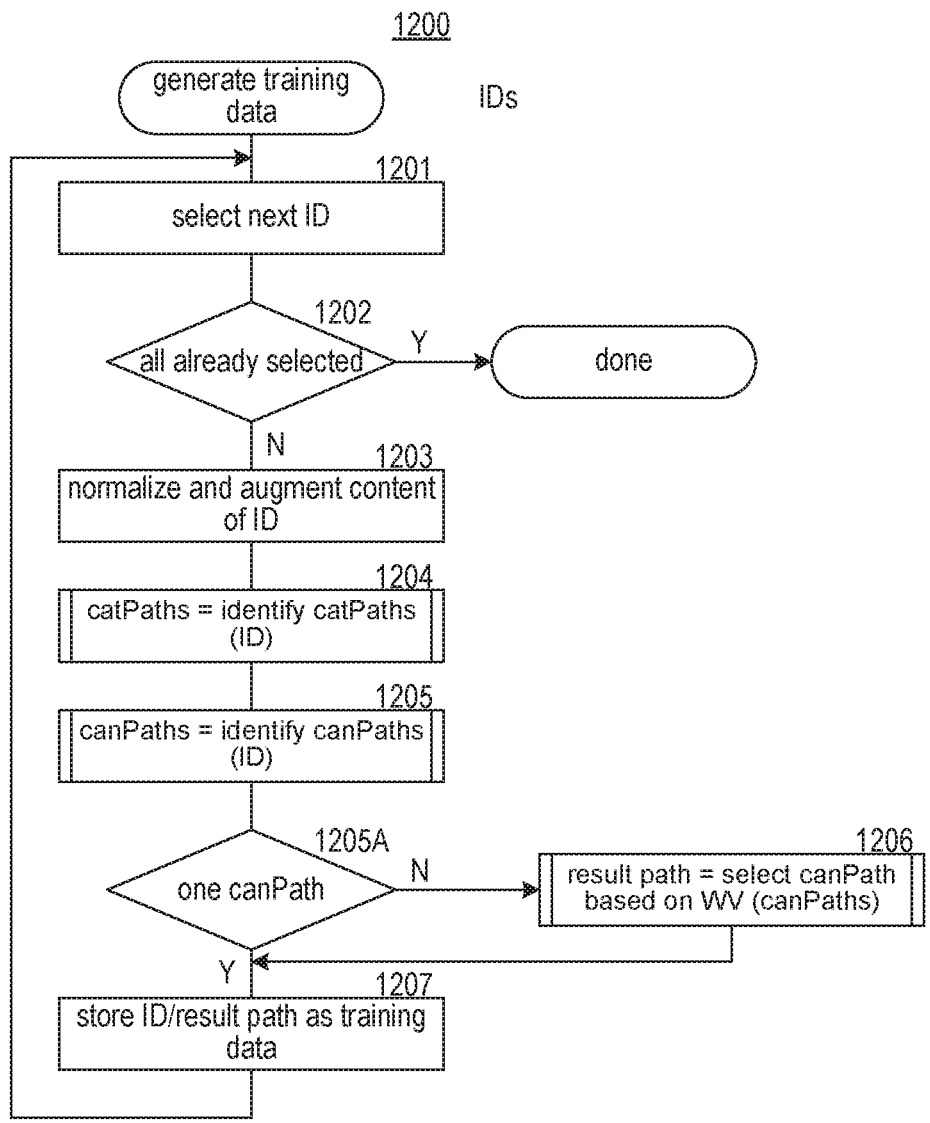
FIG. 12 is a flow diagram that illustrates the processing of a generate training data component of the categorization system in some embodiments.

FIG. 12 is a flow diagram that illustrates the processing of a generate training data component of the categorization system in some embodiments. The generate training data component 1200 is provided IDs and generates the training data using those IDs. In block 1201, the component selects the next ID. In decision block 1202, if all the IDs have already been selected, then the component completes, else the component continues at block 1203. In block 1203, the component normalizes and augments the content of the selected ID. In block 1204, the component invokes an identify category paths component to identify the category paths for the selected ID. In block 1205, the component invokes an identify candidate paths component to identify candidate paths for the selected ID. In decision block 1205A, if only one candidate path was identified, then the component continues at block 1207, else the component continues at block 1206. In block 1206, the component invokes a select candidate path based on word vector component to select a result path for the training data. In some embodiments, multiple result paths may be selected based on their scores having a value above a threshold. In block 1207, the component stores an ID-to-result path mapping as training data and then loops to block 1201 to select the next ID.

The component normalizes the content of an ID using techniques such as converting to lower case, replacing punctuations and symbols with spaces, removing accent marks, and removing redundant whitespace. This normalization helps to reduce the number of elements (i.e., words) with identical meanings. For example, the elements "what's", "whats", "Whats" and "What's" are all commonly occurring variations of an element meaning "what is." These elements may be normalized to "whats" resulting in one element rather than four elements having the same meaning. The component augments content of the ID with relevant variants to increase the opportunities for matching. For example, missing plural or singular forms of nouns are added to the list of categories in the ID.

Figure 13:
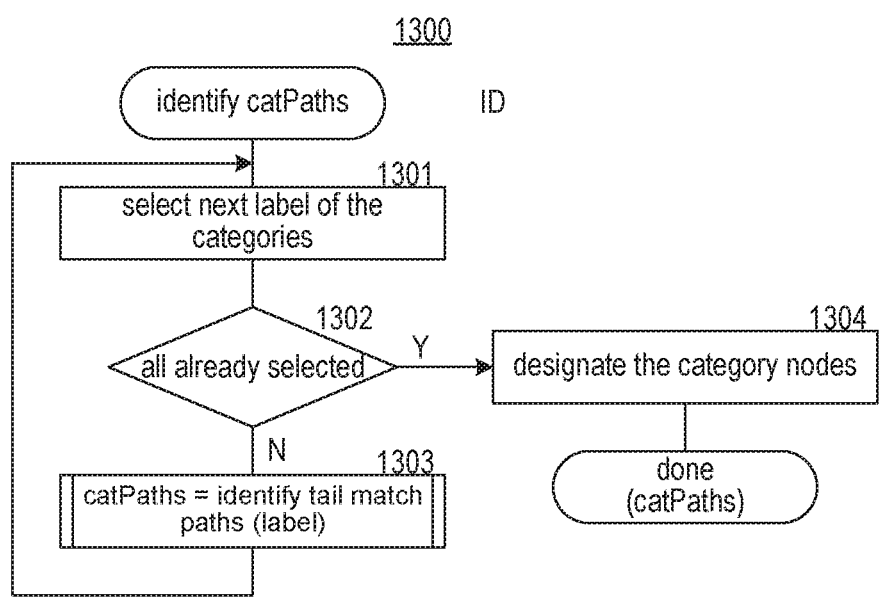
FIG. 13 is a flow diagram that illustrates the processing of an identify category paths component of the categorization system in some embodiments.

FIG. 13 is a flow diagram that illustrates the processing of an identify category paths component of the categorization system in some embodiments. The identify category paths component is provided an ID and then identifies candidate paths for the item with that ID. In block 1301, the component selects the next label of the categories of the ID. In decision block 1302, if all the labels have already been selected, then the component continues at block 1304, else the component continues at block 1303. In block 1303, the component invokes the identify tail match paths component to identify candidate paths with leaf nodes that have a label that is a tail match of the selected label. In block 1304, the component designates the leaf nodes of the category paths as category nodes and then completes.

FIGS. 13A and 13B illustrate tables relating to the identification of category paths for the ID of FIG. 5. Row 1310 illustrates that the "brands" category of the ID does not match the label of any nodes of the taxonomy graph. Row 1320 illustrates that the "active tops" category of the ID matches the label of the leaf nodes of paths 2 and 16, which are thus designated as category paths. FIG. 13B lists just the category paths.

Figure 14:
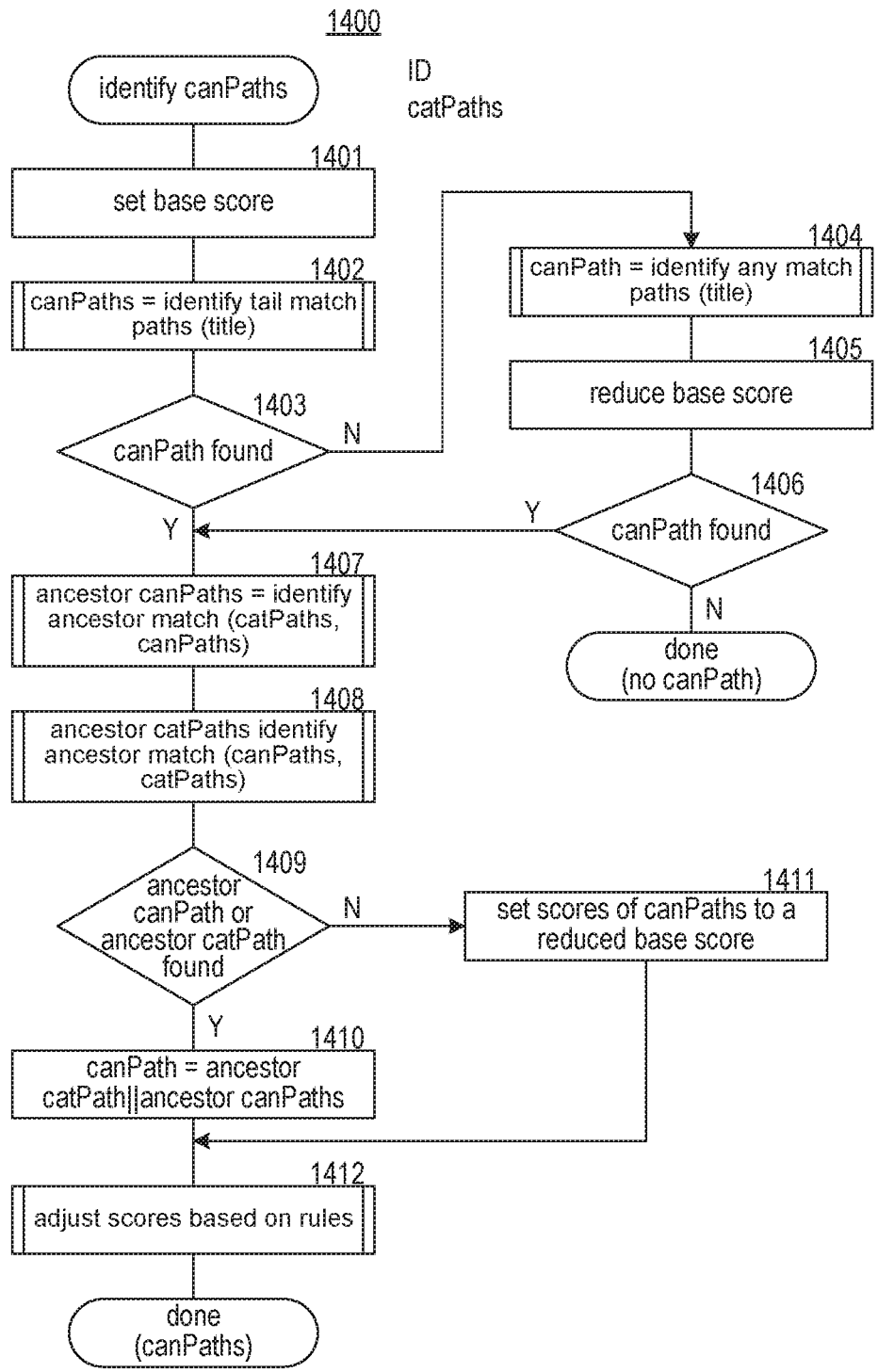
FIG. 14 is a flow diagram that illustrates the processing of an identify candidate paths component of the categorization system in some embodiments.

FIG. 14 is a flow diagram that illustrates the processing of an identify candidate paths component of the categorization system in some embodiments. The identify candidate paths component 1400 is provided an ID and category paths and identifies candidate paths for that ID. In block 1401, the component sets a base score for the candidate paths. In block 1402, the component invokes an identify tail match paths component passing an indication of the title of the ID. The identify tail match paths component identifies as candidate paths those paths with a leaf node that has a label that is a tail match on the title. In decision block 1403, if a candidate path is found, then the component continues at block 1407, else the component continues at block 1404. In block 1404, the component invokes an identify any match paths component passing an indication of the title of the ID. The identify any match paths component identifies as candidate paths those paths with a leaf node that have a label that is an any match on the title. In block 1405, the component further reduces the base score to reflect that an any match is a less relevant match than a title match. In decision block 1406, if a candidate path was found, then the component continues at block 1407, else the component completes indicating that no candidate path was found. In block 1407, the component invokes an identify ancestor match component passing an indication of the category paths and the candidate paths to identify and score each candidate path with a sub-path that matches a category path. In block 1408, the component invokes the identify ancestor match component passing an indication of the candidate paths and category paths to identify and score each category path with a sub-path that matches a candidate path. In decision block 1409, if an ancestor path was found, then the component continues at block 1410, else the component continues at block 1411. In block 1410, the component sets the candidate paths to the combination of the ancestor candidate paths and the ancestor category paths. In block 1411, the component sets the score of the candidate paths to a reduced base score. In block 1412, the component invokes an adjust score based on rules component to adjust the scores of the candidate path based on rules defined for the nodes of the taxonomy graph and then completes identifying the candidate paths.

Figure 15:
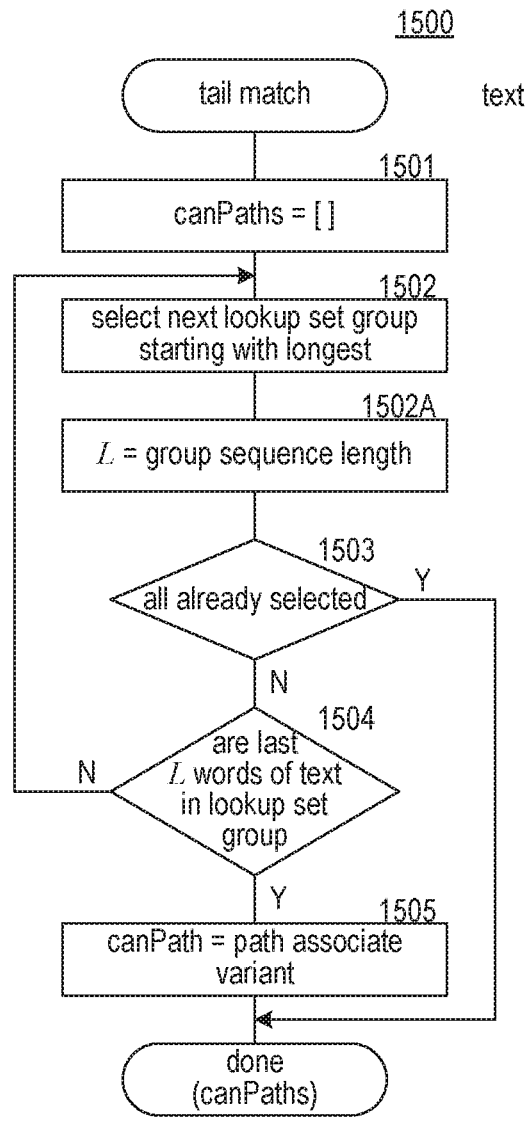
FIG. 15 is a flow diagram that illustrates the processing of an identify tail match paths component of the categorization system in some embodiments.

FIG. 15 is a flow diagram that illustrates the processing of an identify tail match paths component of the categorization system in some embodiments. The identify tail match paths component 1500 is provided text (e.g., a title) and searches the lookup sets for the longest variant (i.e., most elements) that matches the longest tail of the text. In block 1501, the component initializes the candidate paths to empty. In block 1502, the component selects the next group in the lookup sets starting with groups with the longest length that is less than or equal to the length of the text and proceeding to groups with the shortest lengths. In block 1502A, the component sets variable L to the sequence length of the group. In decision block 1503, if all groups have already been selected, then the component completes identifying the candidate paths, else the component continues at block 1504. In decision block 1504, if the last L words of the text appear in the lookup set group, then the component continues at block 1505, else the component loops to block 1502 to select the next variant. In block 1505, the component sets the candidate paths to the candidate paths associated with the selected variant that is the last L words of the text and then completes identifying the candidate paths.

Figure 16:
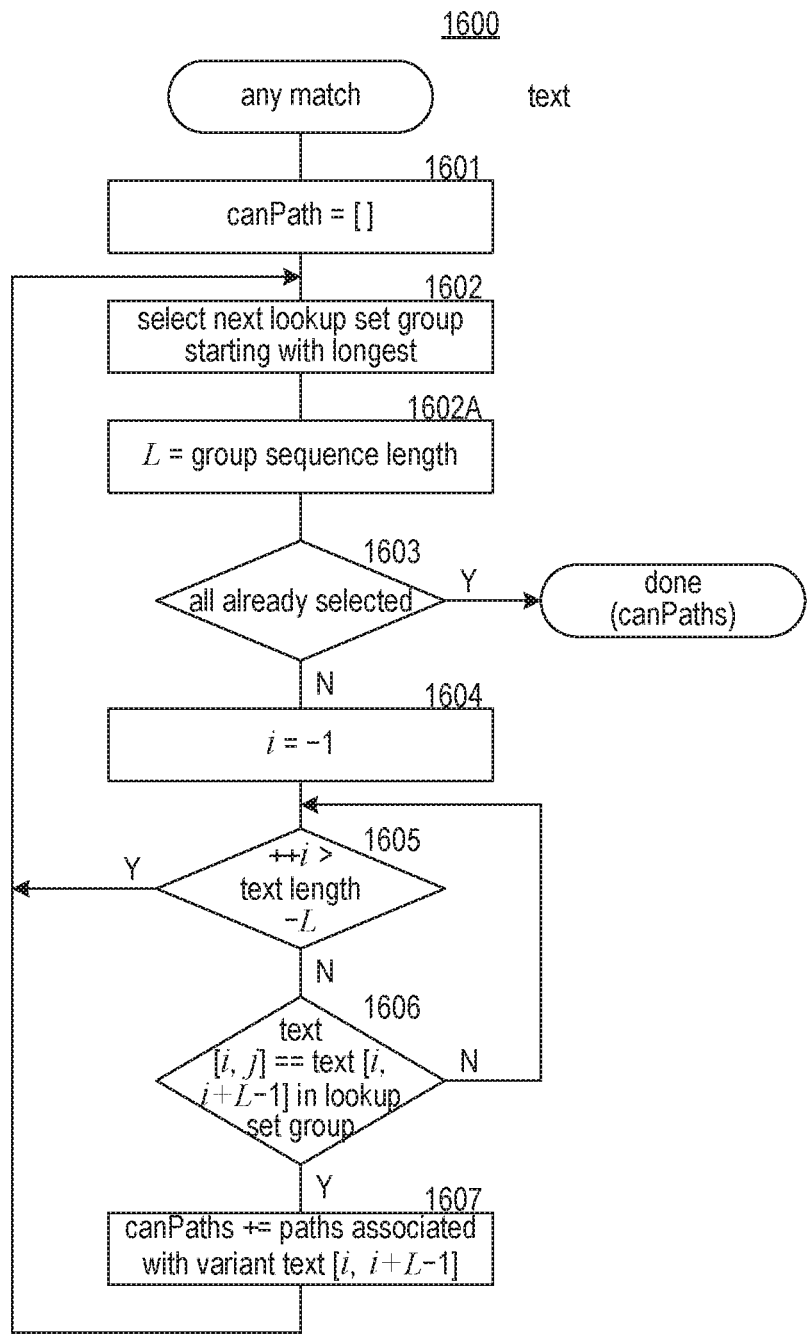
FIG. 16 is a flow diagram that illustrates the processing of an identify any match paths component of the categorization system in some embodiments.

FIG. 16 is a flow diagram that illustrates the processing of an identify any match paths component of the categorization system in some embodiments. The identify any match paths component is provided text and searches the lookup sets for the longest variant that matches a portion of the text. In block 1601, the component initializes the candidate paths to empty. In block 1602, the component selects the next group in the lookup sets starting with groups with the longest length that is less than or equal to the length of the text and proceeding to groups with the shortest lengths. In block 1602A, the component sets variable L to the sequence length of the group. In decision block 1603, if all groups have already been selected, then the component completes identifying the candidate paths, else the component continues at block 1604. In block 1604, the component initializes variables i for selecting portions of the text. In decision block 1605, the component increments variable i and if variable i is greater than the length of the text minus variable L, then the selected variant is not an any match for the text and the component loops to block 1602 to select the next group, else the component continues at block 1606. In block 1606, if the portion of the text delimited by variables i and i+L−1 is present in the lookup set group, then component continues at block 1607, else the component loops to block 1605 to select the portion of the text starting with the next element of the text. In block 1607, the component adds to the candidate paths the candidate paths associated with the selected variant that is the portion of the text delimited by variables i and i+L−1 and then loops to block 1602 to select the next group.

FIG. 16A illustrates a table containing tail matched paths for text. The text is the title "BEBE sequin logo tee." The component searches the lookup sets (FIG. 4) for a variant that matches the tail portions of the text, starting with the lookup set groups for sequence length 3 words with "sequin logo tee" where it finds no match, then sequence length 2 words with "logo tee" where it also finds no match, and finally sequence length 1 word with "tee" where it does find a match. Table of FIG. 16A lists the paths of lookup sets of those matching variants.

Figure 17:
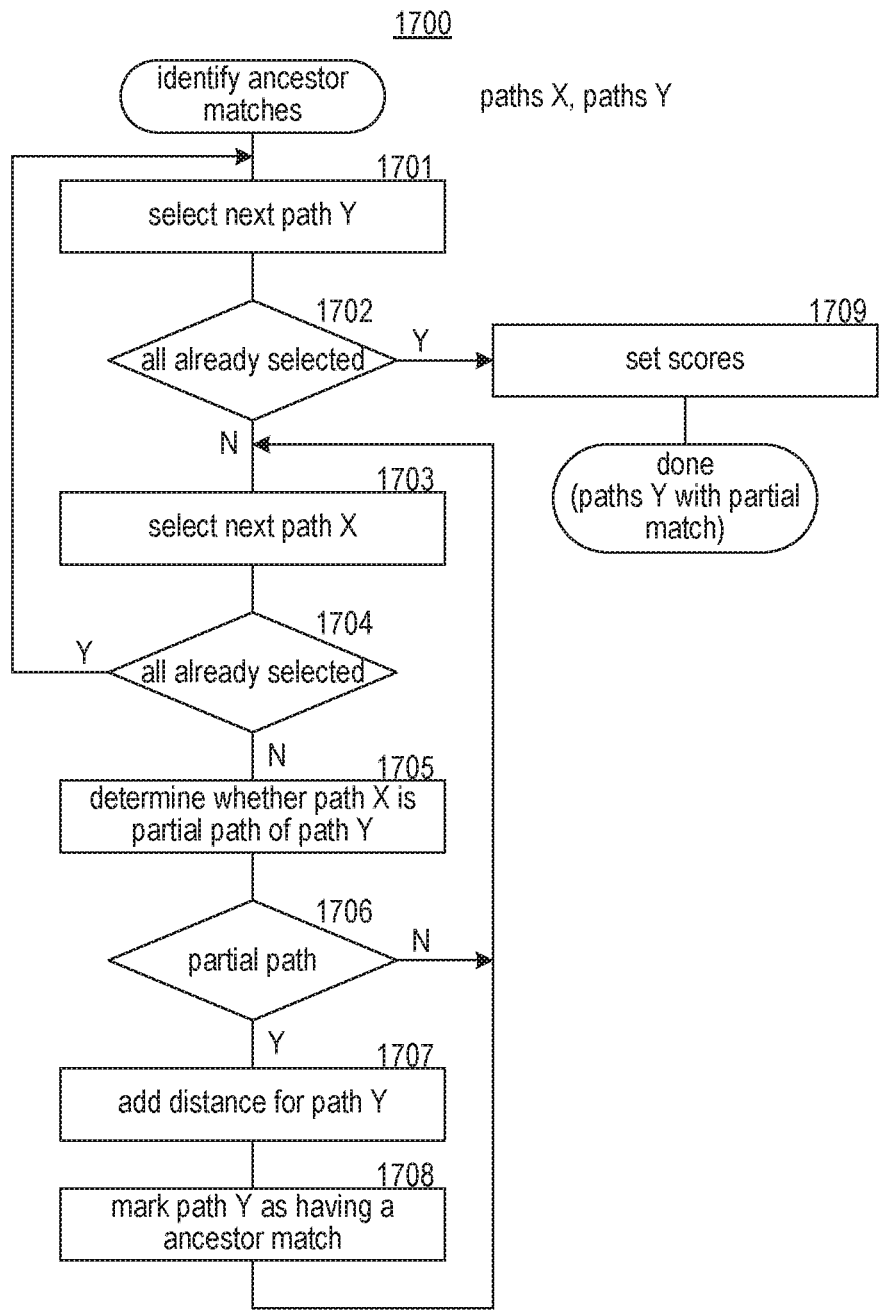
FIG. 17 is a flow diagram that illustrates the processing of an identify ancestor match component of the categorization system in some embodiments.

FIG. 17 is a flow diagram that illustrates the processing of an ancestor match component of the categorization system in some embodiments. The ancestor component 1700 is provided paths X and paths Y and identifies, for each pair of a path X and a path Y, the distance of the ancestor match of path Y if any. The ancestor match of path Y is a partial path of path Y that matches path X. For example, if path X is A/B/C and path Y is A/B/C/D/E, then path Y has an ancestor match given path X because A/B/C is a partial path of A/B/C/D/E. In contrast, the A/C/D/E is not a partial path of A/B/C/D/E. The distance of the ancestor match of path Y is the depth of path Y minus the depth of the partial path. Continuing with the example, the depth of path Y is 5 and the depth of the partial path is 3, therefore the distance of path Y is 2.

In block 1701, the component selects the next path Y. In decision block 1702, if all the paths Y have already been selected, the component continues at block 1709, else the component continues at block 1703. In block 1703, the component selects the next path X. In decision block 1704, if all the paths X have already been selected for the selected path Y, then the component loops to block 1701 to select the next path Y, else the component continues at block 1705. In block 1705, the component determines whether path X is a partial path of path Y. In decision block 1706, if it is a partial path, then the component continues at block 1707, else the component loops to block 1703 to select the next path X. In block 1707, the component records the distance of the ancestor match. In block 1708, the component marks path Y as having an ancestor match and then loops to block 1703 to select the next path X. In block 1709, the component sets the scores for the paths Y with an ancestor match if any based on the distances of each path Y and then completes indicating the paths Y with a partial match.

The ancestor match component identifies whether a first path has a partial path that matches a second path, referred to as an ancestor match. If there is one or more ancestor matches, then the score of the first path is set. The component first calculates the distance of the partial match, which is the depth of the first path minus the depth of the second path. For example, if the first path has depth of 5 and the second path has a depth of 3, then the distance for the first path is 2. The component then generates a multiplier for the base score of the first path. The ancestor matching is performed for multiple second paths. The component sets the multiplier based on the following formula:

$$\gamma(1+\log(n+f(d)))$$

where $\gamma=0.9$ if multiple first paths have an ancestor match, otherwise $\gamma=1.0$ is a score confidence adjustment due to multiple first paths having ancestor matches, n is the number of second paths found, $f(d)$ is a function of the distances, and the log is a logarithmic function (e.g., natural log). The function $f$ can be any of a variety of function such as the min, max, or averages of the distances. The log function compresses the multiplier given to first paths that have a greater distance and the weight given to having multiple second paths. The formula thus provides a small positive bias to first paths with a larger distance because ancestor matches at more distant nodes (i.e., hypernyms) are more likely to use a different vocabulary and are therefore stronger evidence of relevance. The component gives the first path a score that is the product of the base score and the multiplier for that first path.

FIG. 17A illustrates a table containing scores for the candidate paths of FIG. 16A. In this example, the first paths are the candidate paths and the second paths are the category paths. The candidate path 3 has an ancestor match with category paths 0, 1, and 2 with the distances of the partial matches being 3, 2 and 1 respectively. Applying the formula with a maximum function and using γ=0.9, the multiplier for candidate path 3 is 2.51.

Figure 18:
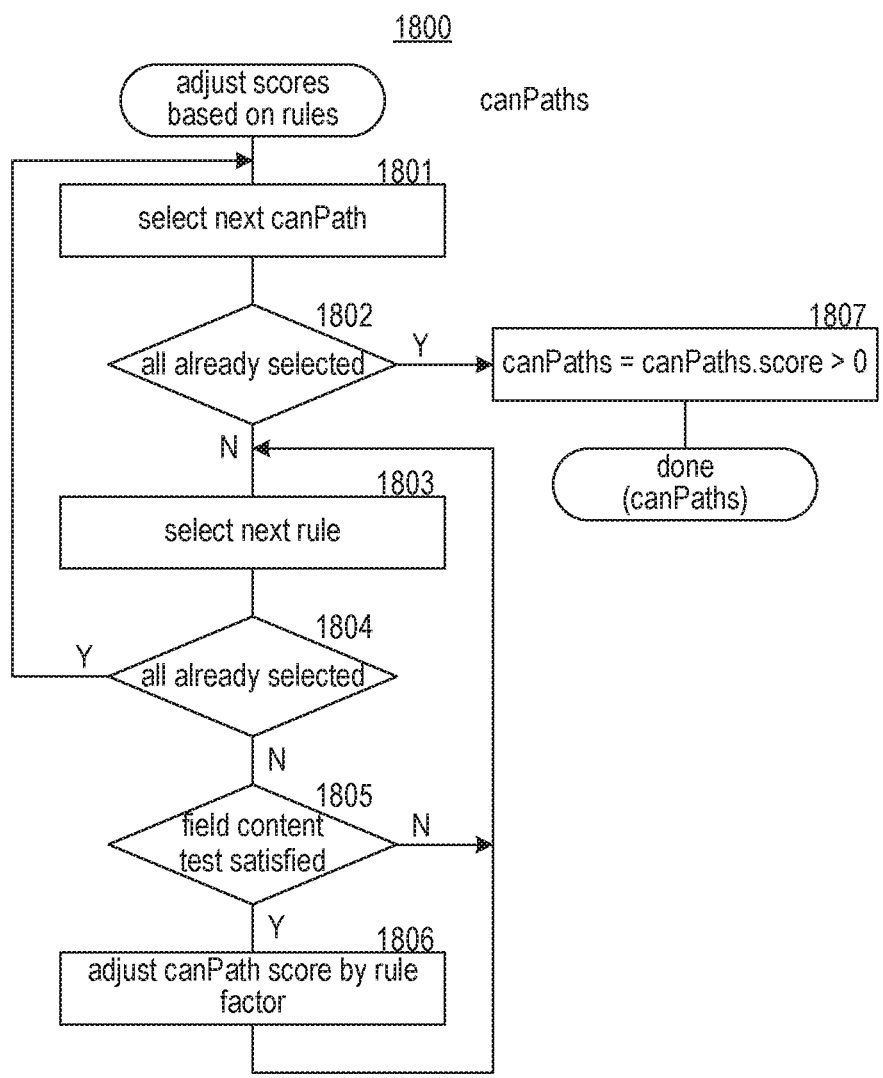
FIG. 18 is a flow diagram that illustrates the processing of an adjust scores based on rules component of the categorization system in some embodiments.

FIG. 18 is a flow diagram that illustrates the processing of adjusting scores based on rules component of the categorization system in some embodiments. The adjust scores based on rules component 1800 is provided candidate paths and the ID and adjusts the scores of each candidate path based on rules associated with all of the nodes of each candidate path. In block 1801, the component selects the next candidate path. In decision block 1802, if all the candidate paths are already selected, then the component continues at block 1807, else the component continues at block 1803. In block 1803, the component selects the next rule of a node of the candidate path. In decision block 1804, if all the rules are already selected, then the component loops to block 1801 to select the next candidate path, else the component continues at block 1805. In decision block 1805, if the field content test of the rule is satisfied for at least one of fields matching the field name filter, then the component continues at block 1806, else the component loops to block 1803 to select the next rule. In block 1806, the component adjusts the score of the candidate path by the multiplier of the rule and then loops to block 1803 to select the next rule. In block 1807, the component sets the candidate paths to those candidate paths with the score above zero and then completes indicating the candidate paths.

FIG. 18A illustrates a table indicating the rule matches for candidate paths. The candidate paths are the candidate paths of FIG. 17A. The candidate paths 9 and 17 are illustrated as not matching a rule. Candidate path 3 has rules 1820 associated with the node with label "activewear" as illustrated in FIG. 2. The first rule has a field name filter of "!any" and a field content test of "activelathletisport." The first rule means that if not any of the fields of the ID contain "active," "athlet," or "sport," then the multiplier is 0.0. The second rule means that if any of the fields of the ID contain "active," "athlet," or "sport," then the multiplier is 1.5. The third rule means that if the title or category fields of the ID contain "baby," "infant," or "toddler," then the multiplier is 0.0. The second rule is satisfied because the content (i.e., category and text) includes "active" in the phrase "active top." As a result, the score 2.51 of candidate path 3 is multiplied by 1.5 resulting in a score of 3.76. If multiple rules apply, a function (e.g., max, product) can be applied to identify the multiplier for the candidate path.

Figure 19:
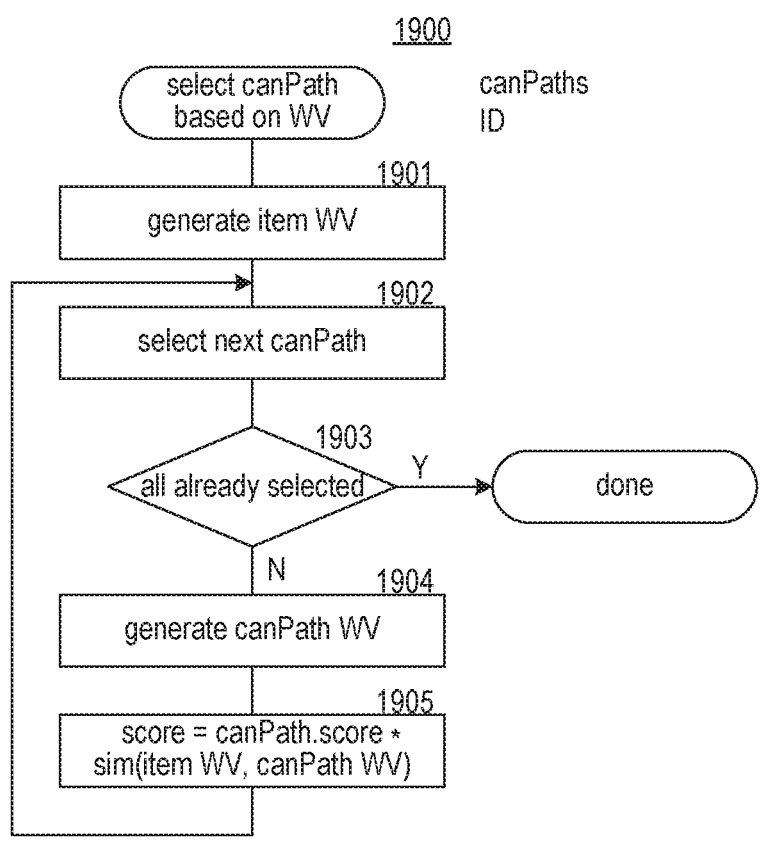
FIG. 19 is a flow diagram that illustrates the processing of a select candidate paths based on word vectors component of the categorization system in some embodiments.

FIG. 19 is a flow diagram that illustrates the processing of a select candidate paths based on word vectors component of the categorization system in some embodiments. The component 1900 is provided candidate paths and an ID and adjusts the score of the candidate paths based on similarity between a word vector representing the ID and a word vector for each candidate path. In block 1901, the component generates the word vector for the item description. In block 1902, the component selects the next candidate path. In block decision block 1903, if all the candidate paths have already been selected, then the component completes, else the component continues at block 1904. In block 1904, the component generates the word vector for the candidate path. In block 1905, the component sets the score of the candidate path to the current score times a similarity factor based on similarity of the word vectors and then loops to block 1902 to select the next candidate path.

Word vectors are numerical vector representations of words which capture syntactic and semantic regularities in language. An example of such is that given vectors for words "King", "Man", and "Woman", the vector arithmetic King−Man+Woman produces a vector which is similar to that of the word vector for the word "Queen". The similarity of word vectors can be determined using a cosine similarity function as represented by the following formula:

$$\text{similarity} = \frac{a \cdot b}{|ab|}$$

where a and b are the word vectors and similarity is the cosine of the angle between the word vectors. Since similarity is monotonic with a range of [−1,1], a similarity of 1 representing best match and a similarity of −1 representing a diametrically opposed match. The categorization system may use similarity as the multiplier. If the similarity is 0, the two vectors are orthogonal and are therefore likely to be semantically unrelated. Thus, the categorization system may employ a score threshold greater than 0 for acceptance of candidate paths to ensure with high probability that only relevant candidate paths are retained.

When multiple candidate paths have leaf nodes with the same label, the categorization system weights labels of ancestor nodes higher than the label of the leaf node. The generating of a vector that increases the weight for each higher-level ancestor node is represented by the following equation:

$$a = \omega(N) + \sum_i \alpha^i \omega(P_i)$$

where ω is a function that converts a word to a vector, N is the leaf node label, $P_i$ is the ancestor node label at depth i (with the depth index as previously described) and α is the weight multiplier per level, nominally set to 2.5. In this way the labels of higher ancestor nodes have a greater influence on the vector direction. The categorization system creates function ω as a preprocessing step using algorithms such as that of Gensim. (See, Řehůřek, Radim, "Scalability of Semantic Analysis in Natural Language Process," Ph.D. Thesis, Faculty of Informatics, Masaryk University, May, 2011.) The vector b is the sum of the word vectors for the collection of the words in the content of the ID.

The categorization system generates a word vector based on a word vector model. Prior to performing any categorization, the categorization system builds a word vector model, for example, using a corpus of documents. The collection of IDs themselves may provide a suitable corpus. When the corpus is sufficiently large, the word vector model will produce satisfactory results, even if new items are introduced as long as the new items use a similar vocabulary to items on which the word vector model was trained. If items with significant new vocabulary are introduced, then the word vector model may need to be retrained.

Figure 20:
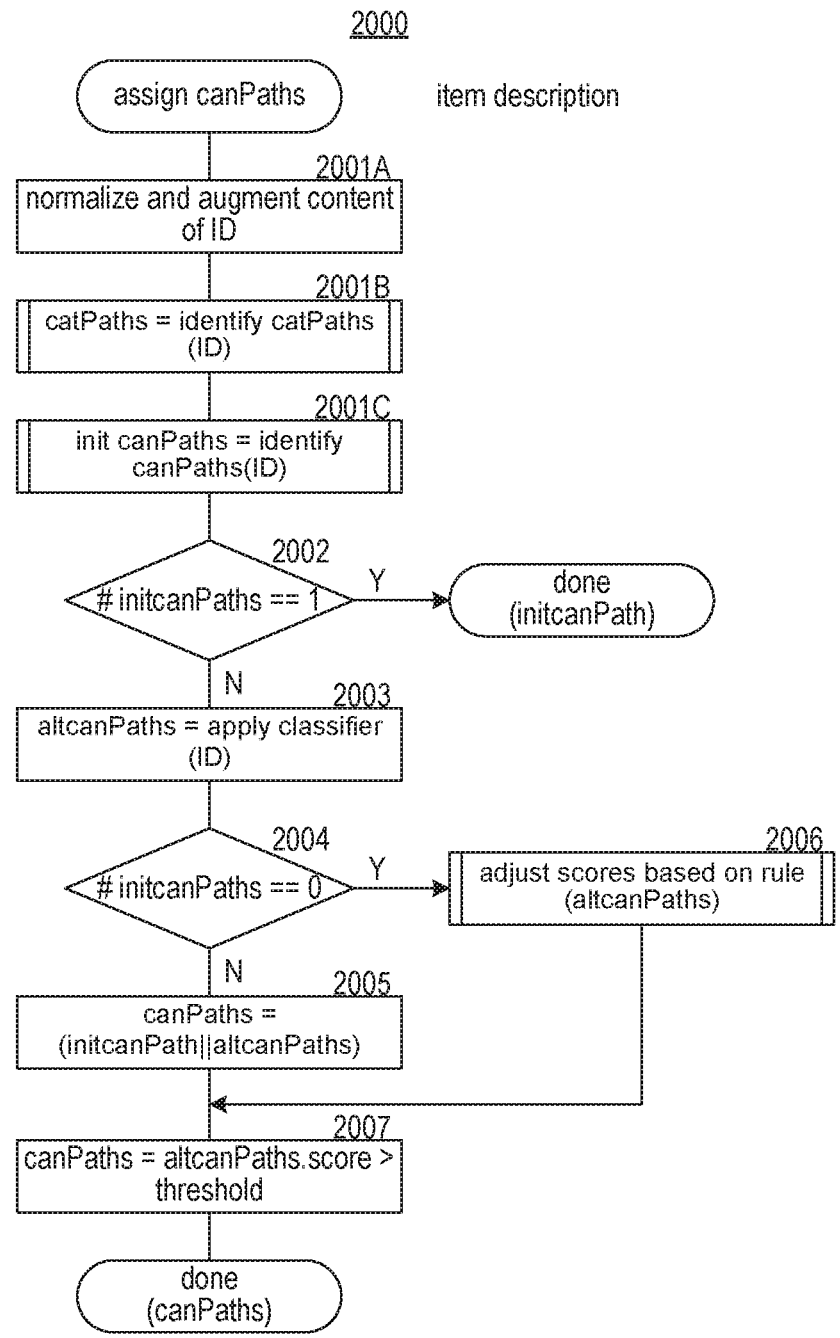
FIG. 20 is a flow diagram that illustrates the processing of an assign candidate paths component of the categorization system in some embodiments.

FIG. 20 is a flow diagram that illustrates the processing of an assign candidate paths component of the categorization system in some embodiments. The assign candidate path component 2000 is passed an indication of an ID of an item and identifies candidate paths so that the candidate path with the highest score(s) can be assigned to that item. In block 2001A, the component normalizes and augments the content of the selected ID. In block 2001B, the component invokes an identify category paths component passing an indication of the ID to identify the category paths. In block 2001C, the component invokes an identify candidate paths component passing an indication of the ID to identify initial candidate paths. In decision block 2002, if one initial candidate path was identified, then the component completes indicating that the initial candidate path is to be assigned to the item, else the component continues at block 2003. In block 2003, the component applies the classifier that was previously trained to the ID to generate alternate candidate paths. In decision block 2004, if the number of initial candidate path is zero, then the component continues at block 2006, else the component continues at block 2005. In block 2005, the component generates scores for the initial candidate paths. The component augments the set of alternate candidate paths with each initial candidate path that is not an alternate candidate, given each a default value that is small (e.g., 0.01). The component sets the score of each alternate candidate path to a combined score of the scores of that initial candidate path and the corresponding alternate candidate path. The component may set the combined score to a weighted sum of the scores. For example, the combined score may be a weighted average of the scores with the score of the alternate candidate path having a weight of four times the weight of the initial candidate path. In block 2006, the component invokes an adjust scores based on rules component passing the alternate candidate paths to adjust the scores of the alternate candidate paths based on the rules. In block 2007, the component sets the candidate paths to the alternate candidate paths with a score higher than the threshold score and completes indicating the candidate paths.

The following paragraphs describe various embodiments of aspects of the categorization system. An implementation of the categorization system may employ any combination of the embodiments. The processing described below may be performed by a computing system with a processor that executes computer-executable instructions stored on a computer-readable storage medium that implements the categorization system.

In some embodiments, a method performed by a computing system is provided for generating training data for training a classifier to assign nodes of a taxonomy graph to items based on item descriptions. Each node has a label. The method accessing item descriptions of items and the taxonomy graph. For each item, the method identifies for that item one or more candidate paths within the taxonomy graph that are relevant to that item. The candidate paths is identified based on content of the item description of that item matching a feature of the nodes. A candidate path is a sequence of nodes starting from a root node of the taxonomy graph. For each identified candidate path, the method labels the item description with the candidate path. The labeled item descriptions compose the training data. In some embodiments, an item description includes a title and one or more category labels. The identifying of the candidate paths for an item includes identifying one or more candidate paths that have a leaf node with a label that matches a tail portion of the title of the item description for that item. The identifying further includes for each identified candidate path, generating a relevance score for that candidate path; determining whether the candidate path includes a partial path that is a category path; and upon determining that the candidate path includes a partial path that is a category path, adjusting the relevance score of that candidate path to indicate an increased relevance. A category path is a path of the taxonomy graph with a leaf node with that has a label that matches a category label. The method discards candidate paths with a relevance score that does not satisfy a threshold relevance. In some embodiments, the identifying of the candidate paths further comprises, prior to discarding the candidate paths, for each candidate path, determining whether a category path includes a partial path that is the candidate path; and upon determining that a category path includes a partial path that is the candidate path, adjusting the relevance score of that candidate path to indicate an increased relevance. In some embodiments, the method further determines whether no candidate path has a leaf node with a label that matches a tail portion of the title of the item description for that item. Upon determining that no candidate path has such a leaf node, the method identifies one or more candidate paths that have a leaf node with a label that matches any portion of the title of the item description for that item. In some embodiments, an item description includes fields having field names and having field content. Prior to labeling, the method accesses accessing rules associated with a node and having a field name test, a content test, and a relevance adjustment. For each candidate path, for each node along the candidate path, for each rule associated with that node, for each field with field name satisfies the field name test of that rule and with field content that satisfies the field content test of that rule, the method adjusts the relevance score of that candidate path based on the relevance adjustment of that rule. In some embodiments, prior to labeling, the method determines whether multiple candidate paths have been identified. Upon determining that multiple candidate paths have been identified, for each candidate path, the method generates a similarity score for that candidate path based on similarity between a word vector for the item description and a word vector for the candidate path. The method discards candidate paths other than the candidate paths with the similarity score above a threshold. In some embodiments, the method trains a classifier using the labeled item descriptions as training data. In some embodiments, for each item, the method applies the classifier to the item description of that item to assign a classification label and a classification score to that item. F each classification label, the method a label threshold for the classification label based on the classification scores of items with that classification label. The label threshold is based on accuracy of the classifier at assigning the classification label.

In some embodiments, a method performed by a computing system is provided for identifying a path of a taxonomy graph to assign to an item description of an item. The method identifies one or more candidate paths within the taxonomy graph that are relevant to the item. The method identifies the candidate paths based on content of the item description of the item matching labels of nodes. Each candidate path has a relevance score. A path is a sequence of nodes starting from a root node of the taxonomy graph. The method applies a classifier to the item description to identify classification paths that each has a classification score. For each candidate path, the method generates a final relevance score for that candidate path by combining the relevance score for that candidate path with the classification score for the corresponding classification path if any. The method assigns to the item one or more candidate paths with a final relevance score indicating that the candidate path is relevant to the item. In some embodiments, an item description includes a title and one or more category labels. The method identifies the candidate paths for an item as follows. The method identifies one or more candidate paths that have a leaf node with a label that matches a tail portion of the title of the item description for that item. For each identified candidate path, the method generates a relevance score for that candidate path and determines whether the candidate path includes a partial path that is a category path. A category path is a path of the taxonomy graph with a leaf node that has a label that matches a category label. Upon determining that the candidate path includes a partial path that is a category path, the method adjusts the relevance score of that candidate path to indicate an increased relevance. The method discards candidate paths with a relevance score that does not satisfy a threshold relevance. In some embodiments, the method further, prior to discarding the candidate paths, for each candidate path, determines whether a category path includes a partial path that is the candidate path. Upon determining that a category path includes a partial path that is the candidate path, the method adjusts the relevance score of that candidate path to indicate an increased relevance. In some embodiments, the method determines whether no candidate path has a leaf node with a label that matches a tail portion of the title of the item description for that item. Upon determining that no candidate path has such a leaf node, the method identifies one or more candidate paths that have a leaf node with a label that matches any portion of the title of the item description for that item. In some embodiments, an item description includes fields having field names and having field content. The method further, prior to selecting the candidate paths, accesses rules associated with nodes. Each rule has a field name test, a content test, and a relevance adjustment. For each candidate path, for each node along the candidate path, for each rule associated with that node, for each field with field name satisfies the field name test of that rule and with field content that satisfies the field content test of that rule, the method adjusts the relevance score of that candidate path based on the relevance adjustment of that rule. In some embodiments, for each candidate path, the method adjusts the relevance score of the candidate path based on a normalization threshold for the classification label of that candidate path, the normalization threshold based on accuracy of the classifier at assigning the classification label.

In some embodiments, one or more computing systems are provided for identifying a path of a taxonomy graph to assign to an item description of an item. The one or more computing systems comprises one or more computer-readable storage mediums storing computer-executable instructions for controlling the one or more computing systems and one or more processors for executing the computer-executable instructions stored in the one or more computer-readable storage mediums. The instructions identify one or more candidate paths within the taxonomy graph that are relevant to the item. Each candidate path has a relevance score. The instructions apply a classifier to the item description to identify classification paths. Each classification path having a classification score. For each candidate path, the instructions generate a final relevance score for that candidate path by combining the relevance score for that candidate path with the classification score for the corresponding classification path. The instructions assign to the item one or more candidate paths with a final relevance score indicating that the candidate path is relevant to the item. In some embodiments, an item description includes a title and one or more category labels and the instructions that identify of the candidate paths for an item identify one or more candidate paths that have a leaf node with a label that matches a tail portion of the title of the item description for that item. For each identified candidate path, the instructions generate a relevance score for that candidate path. The instructions determine whether the candidate path includes a partial path that is a category path. A category path is a path of the taxonomy graph with a leaf node that has a label that matches a category label. Upon determining that the candidate path includes a partial path that is a category path, the instructions adjust the relevance score of that candidate path to indicate an increased relevance. The instructions discard candidate paths with a relevance score that does not satisfy a threshold relevance. In some embodiments, the instructions that identify of the candidate paths for an item, prior to discarding the candidate paths, for each candidate path, determine whether a category path includes a partial path that is the candidate path. Upon determining that a category path includes a partial path that is the candidate path, the instructions adjust the relevance score of that candidate path to indicate an increased relevance. In some embodiments, the instructions further determine whether no candidate path has a leaf node with a label that matches a tail portion of the title of the item description for that item. Upon determining that no candidate path has such a leaf node, the instructions identify one or more candidate paths that have a leaf node with a label that matches any portion of the title of the item description for that item. In some embodiments, an item description includes fields having field names and having field content and the instructions further, prior to selecting the candidate paths, access rules associated with nodes. Each rule has a field name test, a content test, and a relevance adjustment. For each candidate path, for each node along the candidate path, for each rule associated with that node, for each field with field name satisfies the field name test of that rule and with field content that satisfies the field content test of that rule, instructions adjust the relevance score of that candidate path based on the relevance adjustment of that rule. In some embodiments, the instructions, for each candidate path, adjust the relevance score of the candidate path based on a normalization threshold for the classification label of that candidate path. The normalization threshold is based on accuracy of the classifier at assigning the classification label.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for generating training data for training a classifier to assign nodes of a taxonomy graph to items based on item descriptions, each node having a label, the method comprising:

accessing item descriptions of items and the taxonomy graph, wherein an item description includes a title and one or more category labels;
for each item,
identifying for that item one or more candidate paths within the taxonomy graph that are relevant to that item, the candidate paths identified based on content of the item description of that item matching a feature of the nodes, a candidate path being a sequence of nodes starting from a root node of the taxonomy graph,
wherein the identifying of the candidate paths for an item comprises:
identifying one or more candidate paths that have a leaf node with a label that matches a tail portion of the title of the item description for that item;
for each identified candidate path,
generating a relevance score for that candidate path;
determining whether the candidate path includes a partial path that is a category path, a category path being a path of the taxonomy graph with a leaf node that has a label that matches a category label; and
upon determining that the candidate path includes a partial path that is a category path, adjusting the relevance score of that candidate path to indicate an increased relevance; and
discarding candidate paths with a relevance score that does not satisfy a threshold relevance; and
for each identified candidate path, labeling the item description with the candidate path,
wherein the labeled item descriptions compose the training data.

2. The method of claim 1 wherein the identifying of the candidate paths further comprises, prior to discarding the candidate paths:
for each candidate path,
determining whether a category path includes a partial path that is the candidate path; and
upon determining that a category path includes a partial path that is the candidate path, adjusting the relevance score of that candidate path to indicate an increased relevance.

3. The method of claim 1 further comprising:
determining whether no candidate path has a leaf node with a label that matches a tail portion of the title of the item description for that item;
upon determining that no candidate path has such a leaf node, identifying one or more candidate paths that have a leaf node with a label that matches any portion of the title of the item description for that item.

4. The method of claim 1 wherein an item description includes fields having field names and having field content and further comprising, prior to labeling:
accessing rules, each rule associated with a node, each rule having a field name test, a content test, and a relevance adjustment;
for each candidate path,
for each node along the candidate path,
for each rule associated with that node,
for each field with field name satisfies the field name test of that rule and with field content that satisfies the field content test of that rule, adjusting the relevance score of that candidate path based on the relevance adjustment of that rule.

5. The method of claim 1 further comprising, prior to labeling:
determining whether multiple candidate paths have been identified; and
upon determining that multiple candidate paths have been identified,
for each candidate path, generating a similarity score for that candidate path based on similarity between a word vector for the item description and a word vector for the candidate path; and
discarding candidate paths other than the candidate paths with the similarity score above a threshold.

6. The method of claim 1 further comprising training a classifier using the labeled item descriptions as training data.

7. The method of claim 6 further comprising:
for each item, applying the classifier to the item description of that item to assign a classification label and a classification score to that item;
for each classification label, calculating a label threshold for the classification label based on the classification scores of items with that classification label, the label threshold based on accuracy of the classifier at assigning the classification label.

8. A method performed by a computing system for identifying a path of a taxonomy graph to assign to an item description of an item, the method comprising:
identifying one or more candidate paths within the taxonomy graph that are relevant to the item, the candidate paths identified based on content of the item description of the item matching labels of nodes, each candidate path having a relevance score, a path being a sequence of nodes starting from a root node of the taxonomy graph;
applying a classifier to the item description to identify classification paths, each classification path having a classification score;
for each candidate path, generating a final relevance score for that candidate path by combining the relevance score for that candidate path with the classification score for the corresponding classification path if any; and
assigning to the item one or more candidate paths with a final relevance score indicating that the candidate path is relevant to the item.

9. The method of claim 8 wherein an item description includes a title and one or more category labels and wherein the identifying of the candidate paths for an item comprises:
identifying one or more candidate paths that have a leaf node with a label that matches a tail portion of the title of the item description for that item;
for each identified candidate path,
generating a relevance score for that candidate path;
determining whether the candidate path includes a partial path that is a category path, a category path being a path of the taxonomy graph with a leaf node that has a label that matches a category label; and
upon determining that the candidate path includes a partial path that is a category path, adjusting the relevance score of that candidate path to indicate an increased relevance; and
discarding candidate paths with a relevance score that does not satisfy a threshold relevance.

10. The method of claim 9 wherein the identifying of the candidate paths further comprises, prior to discarding the candidate paths:
for each candidate path, determining whether a category path includes a partial path that is the candidate path; and upon determining that a category path includes a partial path that is the candidate path, adjusting the relevance score of that candidate path to indicate an increased relevance.

11. The method of claim 9 further comprising:

determining whether no candidate path has a leaf node with a label that matches a tail portion of the title of the item description for that item;

upon determining that no candidate path has such a leaf node, identifying one or more candidate paths that have a leaf node with a label that matches any portion of the title of the item description for that item.

12. The method of claim 9 wherein an item description includes fields having field names and having field content and further comprising, prior to selecting the candidate paths:

accessing rules, each rule associated with a node, each rule having a field name test, a content test, and a relevance adjustment;

for each candidate path,
  for each node along the candidate path,
    for each rule associated with that node,
      for each field with field name satisfies the field name test of that rule and with field content that satisfies the field content test of that rule, adjusting the relevance score of that candidate path based on the relevance adjustment of that rule.

13. The method of claim 8 further comprising for each candidate path, adjusting the relevance score of the candidate path based on a normalization threshold for the classification label of that candidate path, the normalization threshold based on accuracy of the classifier at assigning the classification label.

14. One or more computing systems for identifying a path of a taxonomy graph to assign to an item description of an item, the one or more computing systems comprising:

one or more computer-readable storage mediums storing computer-executable instructions for controlling the one or more computing systems to:
  identify one or more candidate paths within the taxonomy graph that are relevant to the item, each candidate path having a relevance score;
  apply a classifier to the item description to identify classification paths, each classification path having a classification score;
  for each candidate path, generate a final relevance score for that candidate path by combining the relevance score for that candidate path with the classification score for the corresponding classification path; and
  assign to the item one or more candidate paths with a final relevance score indicating that the candidate path is relevant to the item; and one or more processors for executing the computer-executable instructions stored in the one or more computer-readable storage mediums.

15. The one or more computing systems of claim 14 wherein an item description includes a title and one or more category labels and wherein the instructions that identify of the candidate paths for an item comprises instructions to:

identify one or more candidate paths that have a leaf node with a label that matches a tail portion of the title of the item description for that item;

for each identified candidate path,
  generate a relevance score for that candidate path;
  determine whether the candidate path includes a partial path that is a category path, a category path being a path of the taxonomy graph with a leaf node that has a label that matches a category label; and
  upon determining that the candidate path includes a partial path that is a category path, adjust the relevance score of that candidate path to indicate an increased relevance; and discard candidate paths with a relevance score that does not satisfy a threshold relevance.

16. The one or more computing systems of claim 15 wherein the instructions that identify of the candidate paths for an item comprises instructions to, prior to discarding the candidate paths:

for each candidate path,
  determine whether a category path includes a partial path that is the candidate path; and
  upon determining that a category path includes a partial path that is the candidate path, adjust the relevance score of that candidate path to indicate an increased relevance.

17. The one or more computing systems of claim 15 wherein the instructions further comprise instructions to:

determine whether no candidate path has a leaf node with a label that matches a tail portion of the title of the item description for that item;

upon determining that no candidate path has such a leaf node, identify one or more candidate paths that have a leaf node with a label that matches any portion of the title of the item description for that item.

18. The one or more computing systems of claim 15 wherein an item description includes fields having field names and having field content and wherein the instructions further comprise instructions to, prior to selecting the candidate paths:

access rules, each rule associated with a node, each rule having a field name test, a content test, and a relevance adjustment;

for each candidate path,
  for each node along the candidate path,
    [1] for each rule associated with that node,
      for each field with field name satisfies the field name test of that rule and with field content that satisfies the field content test of that rule, adjust the relevance score of that candidate path based on the relevance adjustment of that rule.

19. The one or more computing systems of claim 14 wherein the instructions further comprise instructions to, for each candidate path, adjust the relevance score of the candidate path based on a normalization threshold for the classification label of that candidate path, the normalization threshold based on accuracy of the classifier at assigning the classification label.

* * * * *